United States Patent [19]
Bechtel et al.

[11] Patent Number: 5,998,929
[45] Date of Patent: *Dec. 7, 1999

[54] CONTROL SYSTEM FOR AUTOMOTIVE VEHICLE HEADLAMPS AND OTHER VEHICLE EQUIPMENT

[75] Inventors: Jon H. Bechtel; Wayne J. Rumsey, both of Holland, Mich.

[73] Assignee: Gentex Corporation, Zeeland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,606

[22] Filed: Aug. 22, 1997

Related U.S. Application Data

[63] Continuation of application No. 08/585,863, Jan. 16, 1996, abandoned, which is a continuation of application No. 08/225,185, Apr. 8, 1994, Pat. No. 5,537,003.

[51] Int. Cl.[6] .................................................. H05B 37/02
[52] U.S. Cl. .......................... 315/82; 315/156; 315/159; 307/10.8
[58] Field of Search ............................ 315/82, 159, 156; 307/10.8

[56] References Cited

U.S. PATENT DOCUMENTS 2,827,594  3/1958  Rabinow .................................. 315/159
3,037,144  5/1962  La Mantia ................................ 315/82

Primary Examiner—Michael B Shingleton
Attorney, Agent, or Firm—Malcolm R. McKinnon

[57] ABSTRACT

A control system is provided for controlling the energization of the headlamps on a first automotive vehicle, the headlamps being electrically energizable and each having a high beam state and a low beam state. The system includes means for collecting light emanating from a second vehicle and means for collecting ambient light. Sensing means is provided which is effective to selectively sense the intensity of the collected light emanating from the second vehicle and the collected ambient light. In addition, the system includes means controlling the state of the beams of the headlamps as a function of the sensed intensity of the beam of light emanating from said second vehicle, and means controlling the electrical energization of the headlamps as a function of the sensed ambient light.

10 Claims, 11 Drawing Sheets

| STEP | S1 | S2 | S3 | S4 | S5 | P1 | P2 | P3 | P4 | P5 |
|---|---|---|---|---|---|---|---|---|---|---|
| 0 | H | L | H | L | L | - | N | - | N | N |
| 1 | H | L | H | L | H | - | N | - | N | - |
| 2 | L | L | H | L | H | N | N | - | N | - |
| 3 | L | H | H | L | H | N | - | - | N | - |
| 4 | L | H | L | L | H | N | - | N | N | - |
| 5 | L | H | L | H | H | N | - | N | - | - |
| 6 | L | H | L | H | L | N | - | N | - | N |
| 7 | H | H | L | H | L | - | - | N | - | N |
| 8 | H | L | L | H | L | - | N | N | - | N |
| 9 | H | L | H | H | L | - | N | - | - | N |
| 0 | H | L | H | L | L | - | N | - | N | N |

FIG. 8

| STEP | S1 | S2 | S3 | S4 | S5 | P1 | P2 | P3 | P4 | P5 |
|---|---|---|---|---|---|---|---|---|---|---|
| 0 | H | L | H | L | L | - | N | - | N | N |
| 2 | L | L | H | L | H | N | N | - | N | - |
| 4 | L | H | L | L | H | N | - | N | N | - |
| 6 | L | H | L | H | L | N | - | N | - | N |
| 8 | H | L | L | H | L | - | N | N | - | N |
| 0 | H | L | H | L | L | - | N | - | N | N |

FIG. 9

CONTROL SYSTEM FOR AUTOMOTIVE VEHICLE HEADLAMPS AND OTHER VEHICLE EQUIPMENT

Thisb application is a continuation of application Ser. No. 08/585,863, filed Jan. 16, 1996 now abandoned, which is a continuation of application Ser. No. 08/225,185, filed Apr. 8, 1994 now U.S. Pat. No. 5,537,003.

BRIEF SUMMARY OF THE INVENTION

This invention relates to control systems for automotive vehicle equipment, and, more particularly, to an improved control system particularly adapted for use in automatically controlling the energization and the state of automotive vehicle headlamps and other vehicle equipment.

Controls to sense the headlamps of oncoming vehicles and to respond by automatically dimming the headlamps of the vehicle in which they are installed have been commercially available at least since the 1950's. However, such controls have not generally been successful in detecting the tail lamps of vehicles traveling ahead of the vehicle equipped with the control. As a result, drivers were still required to manually dim headlamps for a leading vehicle or else compromise the safety of the vehicle's occupants by subjecting its driver to blinding glare in its rearview mirrors. Because no one introduced a control to successfully solve this problem, most of the major automobile manufacturers have withdrawn their headlamp dimmer controls from the market. This withdrawal from a once profitable market is testimony to the fact that the problem is both serious and difficult to solve.

A related headlamp control is one which automatically turns the headlamps on for driving in dark or dimly lighted conditions and turns them off when the daylight is bright enough that the headlamps are not needed. Typical controls of this type also have deficiencies but operate well enough to be desirable and are available on many automobiles. The headlamp on/off controls traditionally utilize a sensor which views generally upward to sense the skylight condition. This sensor viewing arrangement has a number of advantages since the skylight level from overhead is probably the most direct and most stable indicator of the daylight condition. The biggest problem is that on clear, blue sky days, most of the light comes directly from the sun and the illumination level from a given area of the sky which does not include direct sunlight may be lower than the light level viewed from the same portion of the sky on an overcast day even when it may be desirable to have the headlamps on during the overcast day but not the clear day. In other words, if the threshold of a present day headlamp on/off control is adjusted to turn the headlamps on at the desired light level on a blue sky day it tends to turn the headlamps on at too low a light level on cloudy days. Thus, the headlamps are left off when they are needed on cloudy days thereby creating a hazardous condition. On the other hand, if the control is adjusted to turn the headlamps on at the desired light level on cloudy days, it tends to turn the lights on when they are not needed on clear, blue sky days thereby creating an annoyance to some drivers who do not want their lights turned on until they are needed. The decision to turn the headlamps on or off normally comes close to dawn or dusk when the sun is very low in the sky or may even be below the horizon so that merely looking at the sun is not a viable alternative.

The two control functions just mentioned are related but distinct and have been served by separate light sensors in every case known to the inventors. Furthermore, they have normally been served by separate electronic control modules even in instances where the driver related controls have been combined. It is desirable to share the same sensor for both control functions and possibly to extend the use of this sensor to some other functions such as light sensing to estimate heat load for a climate control system or ambient light level sensing for an automatic rearview mirror or ambient light sensing for control of instrument panel lighting intensity.

For the headlamp dimmer control function, the most important time to sense the tail lamps of a leading vehicle is when the headlamps being controlled are on high beam and are likely to blind the driver of the leading vehicle with glare in the rearview mirrors. The high beams which are being controlled illuminate the roadway and objects at the side of the road for a long distance ahead of the vehicle so that light reflected back from these illuminated objects may often either be mistaken for or may drown out weak tail lamps. This is a nearly insurmountable problem when the light over the full required field of view is averaged into a single reading. Designers of prior art controls took two steps to minimize the effect of the light returned from the headlamps as well as to minimize unwanted dimming due to stray light sources. First, they restricted the light sensitive viewing area of the controls sensor so that it includes very little more than the area from which lights of other vehicles must be sensed. The viewing area chosen was approximately 6 degrees high by 18 degrees wide. Secondly, they adjusted and carefully controlled the elevational angle of the sensor's field of view making it as high as practical so that the control still sensed lights from oncoming vehicles while at the same time it rejected light from as much of the brightly lighted patch of roadway just in front of the vehicle as possible. These features are both helpful and did lead to satisfactory sensing of the headlamps of oncoming vehicles for some prior art devices but did not lead to generally satisfactory performance for the far more difficult problem of sensing the tail lamps of leading vehicles. To summarize the problem, the high beams project a large amount of light into the area which must be viewed to detect vehicles for which the headlamps must be dimmed. Each object illuminated by the headlamps in this area reflects some light back. When this reflected light is summed over the entire required viewing area, the total light level may be quite substantial, easily obscuring what may be little more than "pin points" of light from tail lamps several hundred feet away.

Typical prior art headlamp dimmers have utilized easier to apply photo-resistive sensors instead of photo-diode sensors. The presently available photo-resistive sensors are not a practical option for the multiplexed sensor of the preferred embodiment of the invention because of their slow response speed. The photo-resistive sensors have not been used exclusively in prior art devices. For example, a headlamp on/off control, manufactured commercially by the assignee of the present invention, and described in copending application Ser. No. 07/670,258, filed Mar. 15, 1991, and incorporated herein in its entirety by reference, utilizes a photo-diode. The low current output levels of the photo-diodes and the drastic increases in leakage current levels at elevated temperatures created serious design problems which were solved but the solution increased the electronic circuit cost even for sensing the relatively high threshold light levels present in such prior art controls. The light levels and the resulting photo-sensor currents which must be measured by the preferred embodiments of this invention in the color sensing functions and the tail light sensing function for the headlamp dimmer control are a very small fraction of the corresponding operating light and current levels of the aforementioned prior art device. This requires a quantum improvement in the ability to measure extremely low light levels at a modest price.

In a typical light sensing application, it may be impossible to distinguish electrical current due to leakages in the electronic circuit, particularly in the photo-diode itself from the electrical current due to a sensed light level. Thus, the magnitude of these leakage currents frequently establish the lowest light level which may be reliably measured by the photo-diode sensor. The ambient temperature around the control when the vehicle is parked in the hot sun can easily reach 85 degrees C. A rule of thumb is that diode leakage currents double for every 10 degrees C. increase in temperature. This would lead to a 64 to 1 increase in the leakage current of the photo-diode and thus in the minimum light level that could be reliably sensed in going from 25 degrees C. to 85 degrees C. The leakage current in many photo-diodes more than doubles for every 10 degrees C. increase in temperature so the 64 to 1 increase is an optimistic estimate and the real world situation is even worse than this. The low light level sensing problem just discussed is not unique to photo-diodes and it should be understood that many of the features of this invention apply to other light sensors as well. It should also be understood that the photo-diode is the preferred but not the only light sensor which may be used in the present invention.

A photo-diode or other silicon based sensor and the associated electronic circuit which maintains a leakage current which is low enough to assure proper operation at the extremely low light and high temperature levels encountered in the application of the preferred device would be prohibitively costly. The alternative is to block or at least partially block the light which shines on the sensor periodically and to read the sensor output under this darkened condition. The reading may be referred to as the zero light level reading even though it must be understood that the term zero here is not to be taken in the absolute sense since the concept still works when the light level is sufficiently reduced by the blocking means. Light to the sensor is blocked and the zero light level reading is taken and then used to correct or at least partially correct the actual light level readings for the residual reading errors of the control. It is not easy or inexpensive to periodically block the light to the sensor and this blocked light reading must be taken fairly frequently to be effective because of the high dependence of many of the causes of the zero reading errors on changing conditions. As an example note the reference above to the dependence of the sensor leakage current on temperature.

The general light interrupting approach just described has been used in very expensive laboratory equipment such as spectrophotometers to correct for residual reading errors and also to compare a measured light level with an input light level in an optical bridge configuration. The arrangement is sometimes referred to as a light chopper. The inventors of the present invention are not aware of the application of the light chopping technique to any modestly priced devices nor are the inventors aware of any application where the cost of providing the periodic light blocking for the chopping operation is leveraged by utilizing shared components of the light blocking structure to perform one or more of the functions of spatial scanning, multiplexing of inputs from independent sources, or of multiplexing of color filters for color or color balance sensing functions. All of these functions are incorporated in preferred embodiments of the present invention.

IMPROVED STEPPING MOTOR

In the preferred embodiments of the invention described herein a specialized reversible motor which provides a dual rotary and translating movement is utilized to drive the combined, spatial scanning, light chopping, color and color balance sensing, and light input multiplexing functions. It should be noted that except for the full two dimensional spatial scanning a unidirectional motor or more conventional bi-directional motor may be used. Such devices which meet some of the many objectives of this invention are within the scope of this invention. Furthermore, many other bi-directional motors can be adapted to drive even the spatial scanning arrangement. The rotor and bearing arrangement in the preferred embodiments resembles that which is used in small brushless DC fans. Except for this resemblance, the devices are very different since the brushless fan motors are single phase unidirectional devices designed for relatively high rotational speeds. In this description, the word "phase" is used generally to indicate the number of stator poles in the smallest group of stator and rotor poles which form a group which may then be radially copied to form the complete stator and rotor array of poles. This is the geometric configuration made without regard to the polarity of the poles. A normal two phase motor has two stator poles for a single rotor pole and this pattern repeats. A five phase motor has five stator poles for four rotor poles which makes up the entire pole configuration or repeats. The word "phase" is used herein to indicate the magnetic configuration and not the number of controlling inputs connected to the motor.

The specialized requirements for the motor have been satisfied by using a number of innovative features. The axial translating feature of the preferred embodiments is not related to the features described here and it should be understood that the motor of the preferred embodiments can readily be used without the translating feature and should be applicable and advantageous in a large number of stepping motor applications where judicious cost and performance trades can be made beneficially. The motor in the preferred embodiments utilizes a single winding on each of the five poles of the motor stator and the five stator pole face windings are all connected in series to a power supply source. Control of the motor stepping is accomplished by providing transistors to selectively short the windings which encircle each of the individual stator pole faces. Two (preferred) or three of the five individual pole face windings are shorted at any one time so that three (preferred) or two of the poles, respectively, are energized. The main distinguishing features of this motor from the known prior art is that it is a stepping motor capable of bidirectional operation utilizing a permanent magnet rotor and for the normal operation of which each electromagnetic stator pole is energized to only one predetermined magnetic polarity by the energization of any winding or windings which encircle it. Any reversal in the magnetic polarity of the pole from its actively driven polarity is due to the combined effects of the permanent magnets in the rotor and to the energization of windings which encircle other poles in the motor. An optional additional feature of the motor is that the individual pole face windings are connected in series to form one continuous winding which is energized by connection of the entire series winding to a power source with stepping action controlled by providing and exercising means to selectively short windings about the individual pole faces. Shorting of an individual pole face winding has the effect of diverting the series current around the winding thereby removing the source of energization of the pole face to the predetermined polarity. A further optional feature is to step the motor using a sequence for which a majority of the pole face windings are energized to their predetermined polarity in all of the static stepping states. A further optional feature is to use a two pole permanent magnet rotor with a three pole stator and to apply the rules of construction above. A further optional feature is to use any given even number of poles which is greater than one for the rotor and to provide the given even number plus one stator poles and then to generally extend the rules and stepping patterns given for the five pole motor to the resulting motor. A further optional feature is to increase the number of stator and rotor poles by an integral factor n by adjusting the angular arrangement of the base configuration so that it fits in one nth of a revolution and then filling out the configuration by making a total of n radial copies of the configuration. The n corresponding poles are directly connected in series or in parallel and the series or parallel combinations are configured in the same manner as the individual poles of a version not having the duplicated groups of poles. A further optional feature is to control the motor from a micro controller programmed to energize and step the windings in accordance with the required patterns. With the micro controller, many options and variations are available in the control sequence. For example the motor might be controlled for smoother stepping or greater positional accuracy by momentarily providing steps for which fewer than a majority of the windings are energized and some rule might be followed to cause the motor to energize a majority of the windings for step periods of longer duration. Of course, one is not restricted to the stepping mode where the majority of the poles are actively driven. This is an option which is highly beneficial for some applications. A further option of the design is to use a cogged type compound construction on the rotor and stator to increase the effective number of poles for applications requiring finer stepping resolution, such implementation being by means similar to that used for prior art permanent magnet rotor two phase and five phase designs.

Motors known to the inventors which are also five phase but which are otherwise quite different are motors from Berger-Lahr GmbH, Breslauer Strasse 7, D-77933 Lahr, West Germany and from Oriental Motor USA Corp., 2701 Plaza Del Amo, Suite 702-A, Torrance, Calif. 90503. All of these five phase motors known to the inventors drive each pole actively to each of its two different magnetic polarities by reversing the current in the winding which encircles it. These motors are driven either four phases at a time, five phases at a time or in a combination of four and five phases at a time instead of two or three phases at a time which are energized in the preferred embodiments of the present invention. Known prior art motors also use a duplicated pole configuration so that a minimum of ten stator poles rather than five are provided. Furthermore, these prior art motors require a complex drive which has bipolar drive capability to each of the five motor leads and which with drive electronics cost hundreds of U.S. dollars each in small quantities. Production versions of the same drivers could be much less expensive but there is almost no chance of meeting electronic parts cost goals in the range of one dollar for this type of electronic drive without drastic design changes.

A popular practice with other types of stepping motors, such as two phase motors, is to provide two opposing windings which encircle the same pole and to always energize one of the windings to drive the pole to one magnetic polarity and to energize the other winding to drive the pole to its opposite magnetic polarity.

A number of features are needed to provide a low cost stepping motor. To be powerful and reasonably efficient for its size, any small motor needs to utilize a permanent magnet to maintain a strong magnetic field with which the electromagnets in the motor can interact. To have ten or more steps per revolution without going to a more expensive compound design, a permanent magnet having four or more poles is desirable. The greater number of poles on the permanent magnet also reduce the stray magnetic field and the magnetic shielding required to make it possible to use a magnetic compass close to the motor. It is very important to use a design which requires a smaller number of turns of magnet wire, a reasonably small number of separate windings, and which uses a magnet wire size that is large enough to be easy to wind and to terminate reliably without danger of breakage or corrosion damage. For economy it is desirable for a stepping motor for which stepping rate requirements are modest to have its winding(s) energized directly form the DC voltage supply (12 volts in the typical automobile). Use of the permanent magnet has one very large disadvantage. Practically any configuration which uses them requires reversal of the magnetic polarity of the electrically energized poles of the motor. This has normally been accomplished by providing transistor switches to reverse the polarity of at least two windings in a DC stepping motor or by the provision of a duplicated reversed winding on each of the motors electromagnetic poles. In either case poles are actively driven to their north pole polarity during some part of the stepping sequence and to their south pole polarity during some other part of the stepping sequence. Typical two phase stepping motors are either driven with two composite windings which are independently reversible or by four composite windings which can be driven with unipolar drives. This latter design has two windings per pole as described above which are configured as composite windings to work with the four input unipolar drive. A conventional two phase stepping motor requires windings for twice as many pole faces as there are poles on the electromagnet in the rotor. This requires eight poles, each needing a winding, in order to use the desirable four pole permanent magnet rotor. As an "economy" measure to enable the motor to be driven by four single transistor switches instead of the two more complex bipolar transistor drive circuits, the motors are frequently provided with two windings of opposing direction on each pole as mentioned above. This requires sixteen instead of eight windings for the four pole, two phase motor resulting in many more turns of much finer wire for a given application. The typical five phase motor often arranges the five windings in a pentagon configuration for which each of the five "corners" or connections between windings must be driven with a reversible, bipolar drive. Furthermore the windings in a lower cost constant voltage five phase drive are frequently run with four of the five windings simultaneously operated at voltages nearly equal to the supply voltage. Thus where a supply voltage of more than two or three volts is used, each winding must have numerous turns of fine wire for the constant voltage drive. For an automotive application, it is desirable to use 12 volts so there must be enough turns of fine enough copper wire to provide enough resistance to limit the current. If, for example the motor winding power dissipation is limited to 1.44 watts at 12 volts, the total current for the four windings is 120 milliamperes so the current for each winding is 30 milliamperes. This requires 400 ohms per winding or 2000 ohms total for the five windings. It would, for example, require 930 feet of very fine 43 gage wire to equal this resistance and even greater lengths of wire of larger, more reasonable size.

There are some surprisingly effective economizing compromises which are incorporated in the five pole motor used in the preferred embodiments of this invention. First, five stator poles can be used instead of the usual ten for the magnetically symmetrical prior art five phase motors. Second, with the five pole design, the predominance of successive poles with alternate polarity in the magnetic configurations used to step the motor makes it practical to drive only poles which need to be of one preselected polarity in a particular motor step position and de-energize windings around the remaining poles thereby allowing them to be passively forced to their operating magnetic state. The general running configuration for a five pole motor is to have four of the poles of alternating magnetic polarity. Thus, if the option to drive three poles at a time is used, each non driven pole has neighboring poles on each side which are driven to the other polarity. This arrangement enhances the ability to passively drive the non energized poles to their desired polarity. The object of the arrangement is to avoid the great amount of extra electronics or the duplicated windings with many turns of fine wire required to provide the active magnetic reversal for the poles. The technique may also be extended to two phase motors, but passive magnetic drive of the non driven poles will not be as successful because the motors are normally operated with two adjacent poles of one polarity alternated with two adjacent poles of the opposite polarity instead of with the pattern for the preferred motors which alternates polarity for every adjacent pair of poles but one.

There are several options for the winding drive configuration. The first configuration is a parallel one in which each of the five windings has one end connected to the supply and the other to a transistor switch to ground. The winding polarity is such that each pole is driven to its predetermined polarity when its transistor switch is turned on. The transistor switch is turned off to de-energize the winding allowing the active poles to passively force it to the opposite polarity. Then only windings on the poles which need to be driven to the preselected polarity in the stepping sequence are energized and the windings on the remaining poles are de-energized. As a second option, the windings are constructed with fewer turns of heavier wire and connected in series with the winding directions arranged so that when the end connections of the series windings are connected to a DC power source, all of the poles are energized to the same predetermined magnetic polarity. Thus, windings from more than two different phases of a stepping motor are energized in series. The preferred embodiments energize all of the windings in series. A transistor configuration is then added with necessary protection circuitry which permits selective shorting of the individual pole winding sections. The stepping sequence is then accomplished by supplying a continuous DC voltage or current to the series winding and selectively shorting the individual pole winding sections which correspond to the individual poles which should not be energized to the predetermined polarity. Each shorting transistor serves to selectively shunt the current around the winding encircling a particular pole so that the pole is not forced to the predetermined polarity.

As an illustration, assume that the motor is stepped in a mode where three of the five windings are always energized, and assume that the motor is of a size which will dissipate the heat from 120 milliamperes of total current. This is 40 milliamperes per energized winding requiring a winding resistance of 300 ohms per winding for a twelve volt supply. The total resistance of the five windings is 1500 ohms. Thus the parallel winding configuration with the unipolar energization does reduce switching complexity very substantially over a full bipolar drive of the prior art five phase stepping motor but winding resistance is still too high for small motors run from higher voltage sources. Now consider the same motor driven with all its windings energized in a series configuration across the power supply. The nominal power dissipation should be the same so the current through the series winding should be 120 milliamperes. To keep the ampere turns the same for each pole, the number of turns in each winding should be one third of the number used for the parallel configuration because the series winding carries three times the current. To establish 120 milliamperes, the total resistance for the three non shorted windings should be 100 ohms. and the resistance of the individual windings should be 33.3 ohms. The total resistance of the five series windings is 166 ohms. In going from the parallel to the series configuration, the total resistance of each winding section has been reduced by a factor of 9. To do this the wire length is decreased by a factor of three as are the number of turns which must be wound and the wire cross-sectional area is increased by a factor of three. The wire in the series winding takes three times the amount of force to break it and its diameter is 1.73 times the diameter of the wire in the parallel winding. Furthermore the series winding is wound as one continuous piece of magnet wire with the wire simply wrapped around a terminal before and after the winding of each pole face section. The five pole face windings for the parallel version must be wound as separate windings with the corresponding end of each attached to a common terminal and the opposite end of each to an individual terminal. In a typical application four additional transistors and four to eight additional resistors are needed to drive the series arrangement and a higher current carrying capacity is required for the shorting transistors. This is a small price to pay for the greatly reduced winding problems.

The arrangement just described is also applicable for a two pole permanent magnet rotor driven by a stator having three wound poles or for a six pole permanent magnet rotor driven by a stator having seven wound poles or in general for any arrangement having an even number of at least two poles for the permanent magnet rotor and the next higher odd number of wound poles for the stator.

An object of the present invention is to overcome disadvantages in prior automobile headlamp dimming and on/off controls of the indicated character and to provide an improved headlamp dimmer control which may be installed on a vehicle and which incorporates improved means for sensing the tail lamps of a leading vehicle when the leading vehicle is still far enough away for the controlled headlamps of the trailing vehicle to be dimmed to prevent causing excessive glare for the driver of the leading vehicle.

A further object of the present invention is to provide an improved headlamp dimmer control incorporating improved means to detect the red color of the tail lamps of a leading vehicle to aid in the discrimination of the tail lamps from other light sources.

A further object of the present invention is to provide an improved headlamp dimmer control incorporating improved means for limiting the instantaneous field of view of the headlamp sensing sensor to a smaller portion of the total field of view so as to minimize the obscuring effect of the total light emanating from other sources, especially from the road and other objects illuminated by the headlamps which are being controlled.

A further object of the present invention is to provide an improved headlamp dimmer control incorporating improved means for scanning the field of view so that the required total viewing area is covered by a sensor which has the smaller instantaneous field of view.

A further object of the present invention is to provide an improved headlamp dimmer control incorporating improved means for taking a sensor reading when the light level from the sources to be measured is substantially blocked so that the circuit response due to leakage currents, to other circuit effects, and possibly to stray or residual light levels reaching the sensor can be taken into account and at least partially nullified.

A further object of the present invention is to provide an improved headlamp dimmer control incorporating improved means for utilizing the light sensor reading with the blocked light sources to decrease the lowest light level which may be reliably sensed by a factor of three to one and preferably by a much larger factor.

A further object of the present invention is to provide an improved headlamp dimmer control incorporating improved means for utilizing the same sensor to measure more than one component color.

A further object of the present invention is to provide an improved headlamp dimmer control incorporating improved means for utilizing the same sensor to separately measure the light from more than one area within the total field of view of the headlamp dimming sensor.

A further object of the present invention is to provide an improved headlamp dimmer control incorporating improved means for utilizing a sensor with a single sensing area and which does not require separate amplifiers or electrical multiplexing of low level signals to accomplish two or more measurement functions.

Another object of the present invention is to provide an improved headlamp dimmer control incorporating improved means for using only one sensor with only one sensing area and one amplifier means to perform the desired sensing functions.

A further object of the present invention is to provide an improved headlamp dimmer control incorporating improved means for measuring the balance between a color component which is weighted toward the short wavelength part of the color spectrum relative to another color component which is not similarly weighted in order to at least partially differentiate between a cloudy and a blue sky day.

A further object of the present invention is to provide an improved headlamp dimmer control incorporating improved means for using the same sensor to perform part of both the headlamp dimmer and the headlamp on/off sensing functions.

A further object of the present invention is to provide an improved headlamp dimmer control incorporating improved means for sharing a common color discriminating means for both headlamp dimmer and the headlamp on/off control functions.

A further object of the present invention is to provide an improved headlamp dimmer control incorporating improved means for using a single photo-sensor with a single electrical output and amplifying means for combined headlamp dimmer and headlamp on/off sensing functions.

Another object of the present invention is to provide an improved headlamp dimmer control incorporating improved means for including light readings for fields of view which differ substantially from one another in both horizontal and vertical directions.

Another object of the present invention is to provide an improved headlamp dimmer control incorporating improved means for including light readings for fields of view which are close in horizontal direction but which differ substantially in vertical directions.

Another object of the present invention is to provide an improved headlamp dimmer control incorporating improved means for including light readings for fields of view which are close in vertical direction but which differ substantially in horizontal directions.

Another object of the present invention is to provide an improved headlamp dimmer control incorporating improved means for including light readings from fields of view which have substantial overlap, one to another.

Another object of the present invention is to provide an improved headlamp dimmer control incorporating improved means for arranging the relative placement of multiple samples of light levels so that together they include the entire area over which high beams from the vehicle whose lights are under control are likely to cause glare for the driver of another vehicle in order to detect the lights of the vehicle and to respond by dimming the headlamps.

Another object of the present invention is to provide an improved headlamp dimmer control incorporating improved means for using a motor to facilitate a scanning function, and/or a multiplexing function and/or a color component selection function and/or a light blocking function.

Another object of the present invention is to provide an improved headlamp dimmer control incorporating improved means for using a mechanical assembly which performs a substantial portion of its function with one moving assembly.

Another object of the present invention is to provide an improved headlamp dimmer control incorporating improved means for using a motor which limits both the magnitude and the variability of its stray magnetic field well enough to be used in close proximity to a sensor for a magnetic direction finding compass and so that it may meet restrictions placed on magnetic field levels to which vehicle occupants may be subjected.

Another object of the present invention is to provide an improved headlamp dimmer control incorporating improved means for synchronizing or otherwise correlating a compass reading function with the operation of a motor so that the effect of the magnetic field may be minimized and/or compensated for.

Another object of the present invention is to provide an improved headlamp dimmer control incorporating improved means for providing a motor having a reduced number of turns of heavier wire to facilitate winding and to minimize failures due to wire breakage or corrosion.

Another object of the present invention is to provide an improved headlamp dimmer control incorporating improved means for providing a motor which requires only one winding per pole to facilitate construction.

Another object of the present invention is to provide an improved headlamp dimmer control incorporating improved means for providing a motor which requires each of its magnetic poles to be driven to only one magnetic polarity by the winding which encircles it.

Another object of the present invention is to provide an improved headlamp dimmer control incorporating improved means for providing a bi-directional motor which utilizes one continuously energized tapped winding connected in a series configuration across a power supply whereby stepping and direction control is accomplished by selectively shorting or partially shorting segments of the winding between taps.

Another object of the present invention is to provide an improved headlamp dimmer control incorporating improved means for using a reversible motor whose rotor moves in both a rotary and a translational direction in order to accomplish the desired functions.

Another object of the present invention is to provide an improved headlamp dimmer control incorporating improved means for using a motor for which windings on a majority of but not all of the poles are substantially energized while the remaining poles are substantially de-energized and thereby force the magnetic state in each of the remaining de-energized poles to a predetermined magnetic polarity.

Another object of the present invention is to provide an improved headlamp dimmer control incorporating improved means for forcing all of the substantially energized poles of a motor to the same magnetic polarity and to thereby force the remaining substantially de-energized poles to the opposite polarity.

Another object of the present invention is to provide an improved headlamp dimmer control incorporating improved means for utilizing a bi-directional stepping motor with an odd number of wound physical poles.

Another object of the present invention is to provide an improved headlamp dimmer incorporating a moving baffle to minimize interference of one optical signal with another.

Another object of the present invention is to provide an improved headlamp dimmer incorporating colored mirror reflectors to separate color components in input signals.

Another object of the present invention is to provide an improved headlamp dimmer control incorporating improved means for arranging a motor and screw and a rotary selector so that they fit together in a compact structure.

Another object of the present invention is to provide an improved headlamp dimmer control incorporating improved means for arranging the mechanical parts thereof so that high reliability and reproducibility can be achieved without having to maintain unrealistically tight tolerances.

Another object of the present invention is to provide an improved headlamp dimmer incorporating a positive, non-binding stop at at least one and preferably both ends of the travel range whereby one of these stops serves to establish a home position for the unit and together the stops serve to assure that the unit cannot be driven to a position in which it could jam.

Another object of the present invention is to provide an improved headlamp dimmer control incorporating improved means for incorporating the filters with a reflector as a light transmissive body of a second surface mirror so that the filtering and reflection are achieved with only one exposed optical surface.

Another object of the present invention is to provide an improved headlamp dimmer control incorporating improved means for incorporating filters separately on a moving member in a headlamp control to eliminate the sensing of unfiltered first surface components in a mirror.

Another object of the present invention is to provide an improved headlamp dimmer control incorporating improved means for utilizing a negative focal length entrance lens of larger cross-sectional area than a light pipe or light directing means to which it attaches in order to increase the amount of light which is sampled over a wide viewing angle and which is directed into the light pipe.

Another object of the present invention is to provide an optical sensor which has a light concentrating lens which in operation does not maintain focus on a sensor or other vulnerable spot for a sustained period of time thus taking the risk that the sun's rays will be focused on the spot for a long enough period of time for heat to build and cause damage.

Another object is to provide a unit which positions a reflector in a position which does not permit the sun's rays to come to focus and cause damage while the unit is inactive.

Another object of the present invention is to provide an improved headlamp dimmer control incorporating improved means for utilizing an array type light sensor.

Another object of the present invention is to provide appropriate dimensional offsets so that corresponding fields of view taken with various color filters register closely with each other.

Another object of the present invention is to provide an improved headlamp dimmer control incorporating improved means for causing the headlamp dimmer portion of the control to respond to an increase in reading due to a sensed scattered light level from suddenly visible bright oncoming headlamps in a way which causes the control to decrease the delay in dimming the controlled headlamps.

Another object of the present invention is to provide an improved headlamp dimmer control incorporating improved means for providing more than one sensing port and associated optics with each port being rotatable to bring it into alignment with an optical signal source.

Another object of the present invention is to provide an improved headlamp dimmer control incorporating improved means for providing more than one optical signal source to which at least one associated sensing port may be rotated to achieve optical alignment to take a reading.

Another object of the present invention is to provide an improved headlamp dimmer control incorporating improved means for simultaneously providing more than one sensing port each of which is focused on a common sensor during a portion of its rotary motion and which during said portion of its rotary motion is brought into alignment with more than one optical source at different parts of said portion of its rotary motion.

Another object of the present invention is to provide an improved headlamp dimmer control incorporating improved means for providing more than one sensing port each with a different sensing feature such as a different filter or sensing port aperture or lens configuration as part of a rotary assembly.

Another object of the present invention is to provide an improved headlamp dimmer control incorporating improved means for coupling a sensor efficiently to an optical signal transmitted by a light pipe.

Another object of the present invention is to provide an improved headlamp dimmer control incorporating improved means for providing for the selection of at least three and up to six or more different selectable filters in a selected combination which can be used sequentially in any desired sequence to read inputs from a selected number of the optical signal sources.

Another object of the present invention is to provide an improved headlamp dimmer control incorporating improved means for using a separate lens which is not part of a rotating assembly to approximately focus an image on the a surface into which a sampling port or ports may be positioned whereby the optics and filters associated with the sampling port then filter and redirect or re-focus at least a portion of the image which impinges on the port directing it to a photo detector.

Another object of present invention is to provide an improved headlamp dimmer control incorporating improved means for using rotary motion of a head to change position of a sampling port within the image field of separate lens to obtain sensor readings for different areas of the separate lens's projected image.

Another object of the present invention is to provide an improved headlamp dimmer control incorporating improved means for making an adjustment, such as translation of a rotary head along its axis of rotation, or movement of a sensor or lens to accomplish sampling of the field of view in a portion not covered by a simple rotary sweep of an aperture through a field of view.

Another object of the present invention is to provide an improved headlamp dimmer control incorporating improved means for using light gathering means for each signal input which gathers the proper amount of light to place using a signal to be measured within the measuring range of a common sensor.

BRIEF DESCRIPTION OF DRAWINGS

FIG. 8 is a list of stepping motor shorted winding control inputs and of the resulting polarities to which the magnetic poles are driven by non shorted encircling windings.

FIG. 9 is a subset of entries from FIG. 8 for which three (a majority of) the pole face windings are energized.

DETAILED DESCRIPTION

Electro-Optical Sensing Module Description

Figure 1:
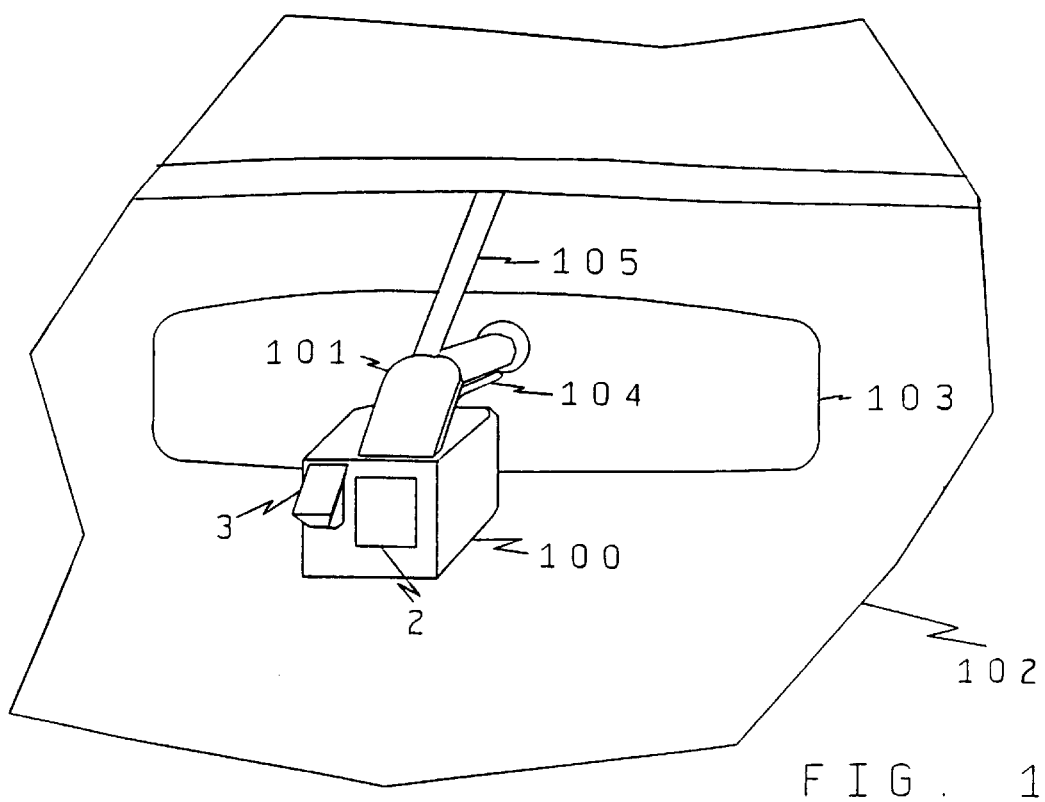
FIG. 1 is a simplified pictorial diagram viewed through the windshield which depicts the application of a combined headlamp dimmer and headlamp on/off electro-optical sensor unit embodying the present invention.
Figure 1A:
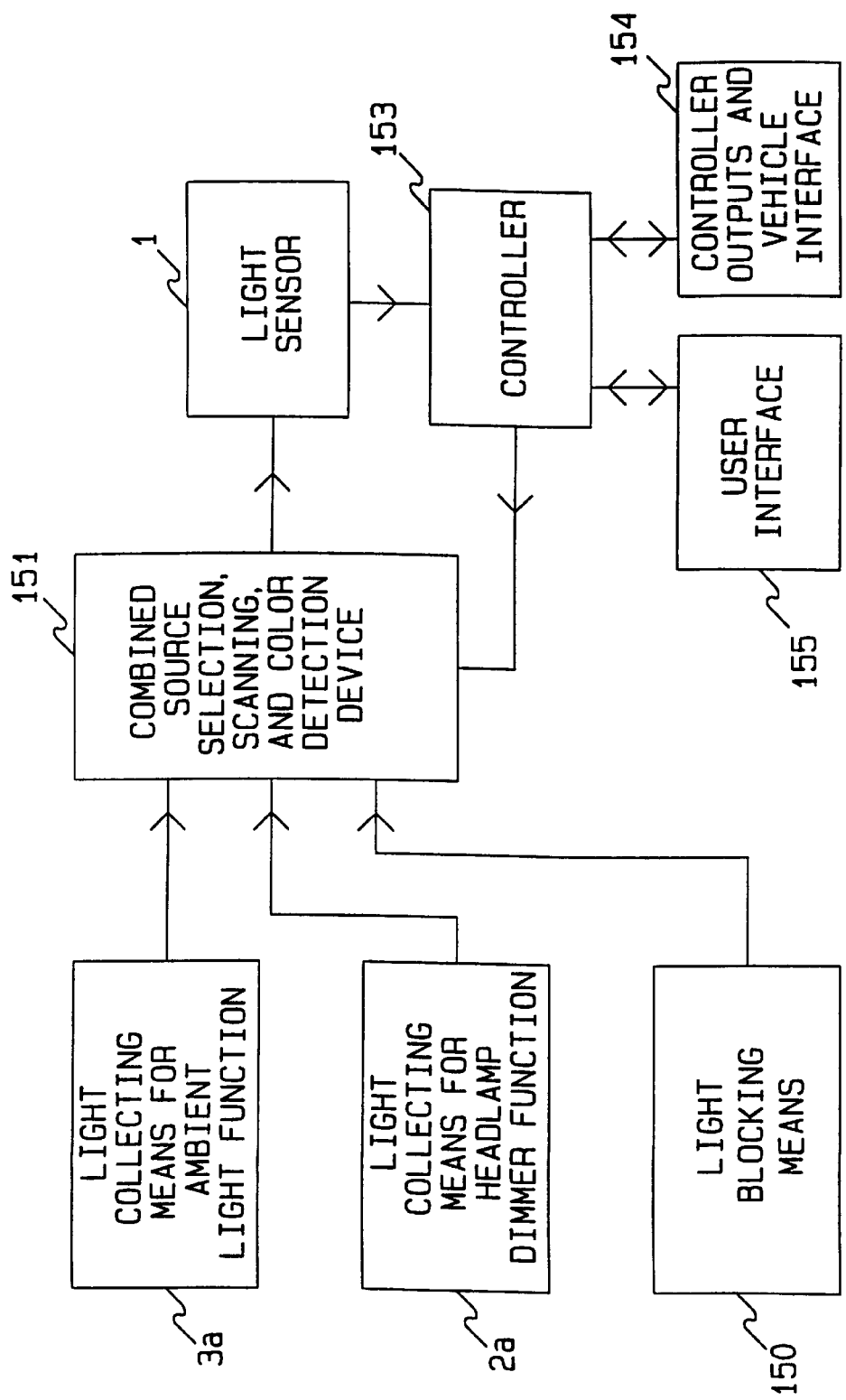
FIG. 1a is a simplified block diagram which includes blocks depicting major components of the device of this invention and several blocks with which these components interface.
Figure 2:
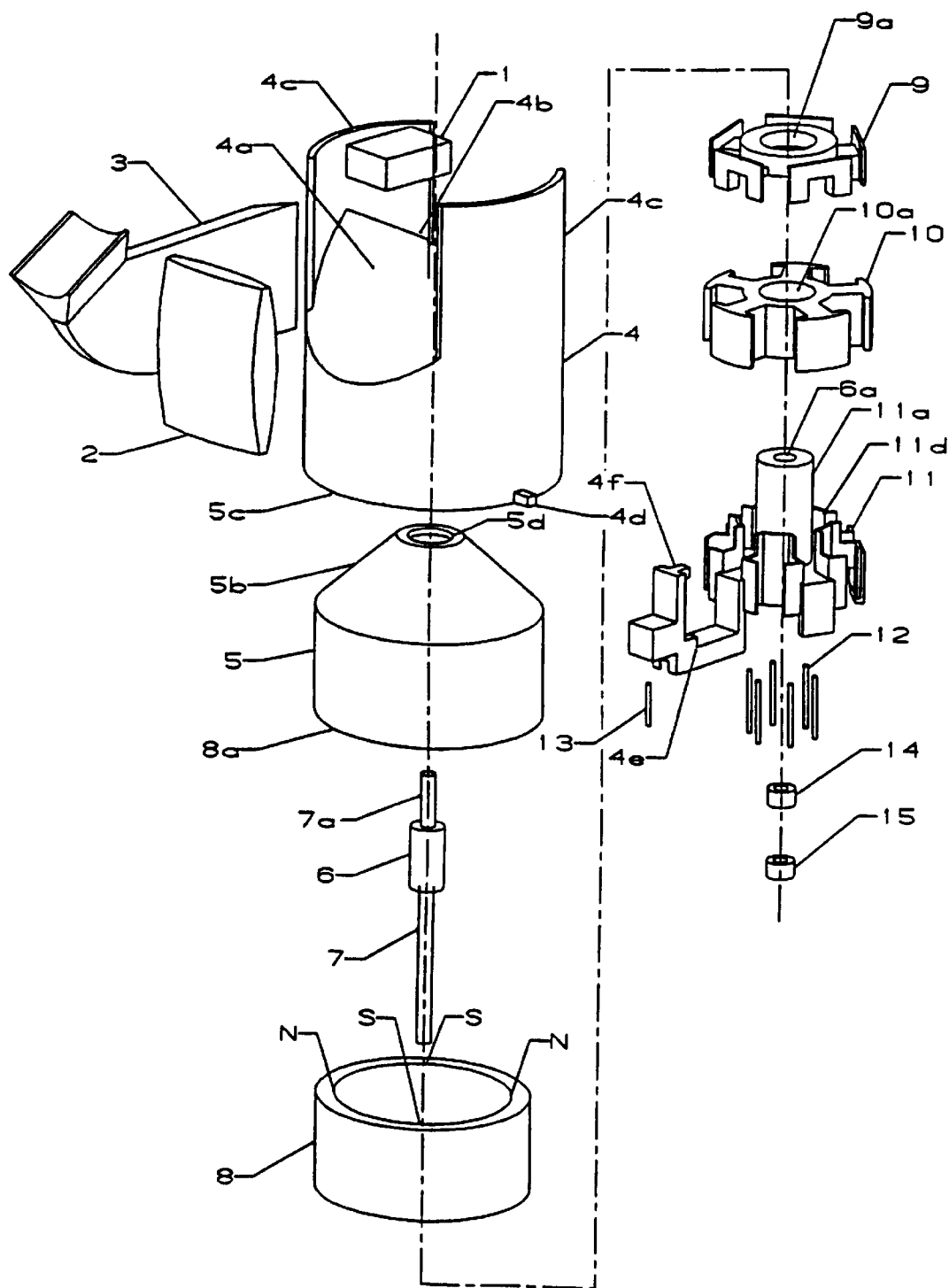
FIG. 2 is an exploded view which depicts the mechanical, optical, and electro-optical components in the combined headlamp dimmer and headlamp on/off control embodying the present invention.

Referring to the drawings, the simplified pictorial diagram in FIG. 1 depicts the application of the electro-optical sensing structure for the combined headlamp dimmer and headlamp on/off control which embodies the present invention and which is shown in an exploded view in FIG. 2. In the block diagram of FIG. 1a, the light sensor 1, the combined source selection, scanning, and color detection device 151, the light blocking means 150, the light collecting means for the ambient light function 3a, and the light collecting means for the headlamp dimmer function 2a are normally housed in the module 100 of FIG. 1. Portions of the remaining controller and user and vehicle interface functions depicted in blocks 153, 154, and 155 may be included in module 100 and other portions may be placed elsewhere.

The multiple functions of block 151 are primarily performed by the assembly shown in FIG. 2. FIG. 2 also depicts components for the individual light collecting means 2a and 3a, the light blocking means of block 150, and of the light sensor 1. Details of portions of the assembly of FIG. 2 and of configurations for particular operating states thereof are depicted in FIGS. 3 through 6.

The controller 153 controls the source selection, scanning and color detection functions of block 151 via control of the stepping motor contained in block 151. Unique features of the motor and details of the control function are detailed in various sections throughout this disclosure and details of the motor control and stepping sequence are depicted in FIGS. 7, 7a, 8, and 9 and the associated description.

Although many features of this invention apply for separate headlamp on/off and headlamp dimmer control functions, the embodiment shown performs both functions, thereby benefiting from utilizing shared resources. Although there is great benefit from sharing many of the resources for the two control functions, it is necessary to provide some features which are individually adapted for their specific function. The most notable of these special individualized features are the headlamp on/off control light collecting means 3a and the headlamp dimmer light collecting means 2a. As will be explained later, the light collecting means 3a for the headlamp on/off control function covers a broad viewing area and in the embodiment shown, this field of view is not scanned. The light collecting means 2a for the headlamp dimmer function, on the other hand, covers a relatively restricted total field of view and the scanning function serves to further break this field of view into considerably smaller sub fields as will be described in detail later. Light from each of the fields of view for the two functions is directed to a unit which serves to select and thereby multiplex the two inputs as well as to perform scanning, color distinction, and reading error correction functions which are of benefit to one or to both of the sensing and control functions. Note that the viewing direction, the required field of view and the choice to scan the field or to not scan the field are all very different for the two sensing functions. It is most practical to provide individualized light collecting means for these two functions and to provide a selection means to access them individually as opposed to attempting to use a single shared light collecting means with a wide angle field of view to perform both functions. A sensing light collecting means having a single field of view and having both the sensitivity and the resolution to serve the headlamp dimmer function and the extended field of view to serve the headlamp on/off function would be unnecessarily elaborate and expensive. The use of individualized light collecting means followed by the selection means is an important feature of the invention which may be used with other sensors and with other means of optical selection.

It should be apparent that features of the device for optical source selection may be readily extended to perform many other optical functions as to, for example, perform the ambient light sensing function for an automatic rearview mirror.

The view in FIG. 1 is through a vehicle windshield 102. The mechanism of FIG. 2 is housed with associated electronics in a case 100 which is mounted to a button 101 on the windshield 102 of the vehicle along with a rearview mirror 103. Driver controls for the unit may be incorporated on the mirror housing and associated electronics for the low level electrical signals from the light sensor should be included in the case 100 but the remaining electronics may optionally be placed elsewhere or dispersed to any desired locations. With the embodiment shown, it is assumed that some of this electronics is in the mirror housing. The cable 104 supplies power and connects control input and output signals to the headlamp control case 100 and connects these signals to the mirror 103. The cable 105 in turn connects the mirror 103 to the vehicle's power supply which includes both the conventional continuously energized vehicle 12 volt supply and the conventional ignition switched 12 volt supply. The cable 105 also connects to a relay or relays which energize and de-energize the headlamps, running lamps, and tail lamps and to a relay which switches between the vehicles high beam and low beam configurations. Outputs and/or two way communication related to the above and also to other features such as an ambient light sensor for use in the control of a rearview mirror, in an instrument panel intensity control, or in a vehicle heat load control may also be provided. Other light inputs may be routed to the sensor module and their readings multiplexed with other readings in some embodiments of this invention. The relay functions may be accomplished by either electronic or electromechanical means. The light guide and entrance lens assembly 3 for the headlamp on/off function extends forward from the case 100 so that light from a wide area of the sky falls on its entrance lens through the windshield 102 and a portion of this light is directed to and sampled by the sensing unit in case 100. Likewise the lens 2 may be positioned with reasonable but not extraordinary precision to view the headlamps of oncoming vehicles and the tail lamps of leading vehicles and to communicate and focus these signals on the unit's sensor. The sensor units both view through a portion of the vehicle windshield which is kept clear by the vehicle's windshield wipers.

FIG. 2 is a simplified diagram of the headlamp control and ambient light sensing electromechanical assembly which is mounted in the case 100. The light guide and integral lens and reflector 3 and the lens 2 are attached to and view through an opening or window in the case 100. The sensor 1 is secured and electrically connected in a stationary position on a circuit board (not shown) in the case 100. Components 4, 5, 6, 7 and 8, which will be described hereinafter in greater detail, are attached together in a rigid assembly which rotates and translates axially as will be described herein. Components 9 through 15, which will also be described hereinafter in greater detail, form the stator, bearing, and stop assemblies for the motor. The motor winding coil forms are depicted but the windings are not. The stator, bearing, and stop assembly is secured and electrically connected in a stationary position to a second circuit board (not shown) in the case 100. The circuit boards to which the sensor and motor assemblies are attached also preferably have a portion of the headlamp control circuit on them and are interconnected to each other and to the cable 104.

The components 4 through 15 form a motor which rotates and translates the rotary head 4 to perform a combined optical signal selection, optical signal blocking, optical signal scanning, and color filter selection process which will be described hereinafter in greater detail. The components 1 through 4 are shown in their normal operating positional relationship and the remaining components are shown in exploded view to facilitate description of their form and function.

Detailed Motor Description

The component 5 is a cylindrical metal can of light weight having cylindrical sides and a generally conical top which nests with the inclined mirror surfaces 4a and 4b of the rotary head 4. The can 5 slides into the bottom of rotary head 4 and is secured therein in a relationship which maintains close axial alignment of the parts. The hole 5d registers with an internal, axially aligned, cylindrical protrusion (not visible), which extends axially downward from the intersection of mirrored surfaces 4a and 4b in the interior of the rotary head 4. Close registration of the hole 5d with the protrusion maintains the axial alignment between the rotary head 4 and the can 5 at the top and a close fit preferably augmented with radially spaced very shallow internal ribs on the inner surfaces of the cylindrical portion of the rotary head 4 maintain the axial alignment at the lower extremities of the rotary head 4 and the can 5. The parts are fastened together to form a secure unit. The can 5 is preferably made of a high permeability, low magnetic hysteresis magnetic material (optionally of a hydrogen annealed nickel iron material such as might be used in the magnetic structure of the thermocouple safety on a gas appliance) in order to contain the magnetic field from a magnet 8 and minimize interaction with the sensor for a magnetic compass in applications where such a sensor is mounted within several inches of the motor.

The open cylindrical structure 8 is a ferrite ring magnet having four equally spaced N-S-N-S poles on its inner cylindrical surface. It is pressed into the cylindrical portion of member 5 so that its shape and position are maintained by the can 5. The height of the magnet 8 is made great enough to provide an adequate magnetic field for the stator as it translates through its entire translational range of about five millimeters. The design is preferably but not necessarily made with the four pole permanent magnet structure rather than a two pole structure to help minimize the radiated magnetic field. When assembled the rotary head 4, the can 5, and the magnet 8 form a rigid assembly with their lower edges approximately aligned. If the number of poles are changed, the stator and its related circuit must be altered to match.

Portion 7a of shaft 7 is pressed into an axially aligned hole in the internal cylindrical protrusion (referred to above) in the rotary head 4. The shaft becomes a rigid part of the assembly and is held in precise axial alignment by the press fit into a hole which engages the shaft over a length which is great enough to provide precise axial alignment. The member 6 is a screw thread which is pressed onto shaft 7 or as a desirable alternate is integrally molded as a portion of the rotary head 4. This thread is nominally a 4 millimeter diameter, 1 millimeter pitch, ACME thread which is specially modified to have a generous radial clearance to eliminate the chance of binding. This modification consists mostly of modestly under sizing the radial dimensions of the screw and/or over sizing the corresponding dimensions in the nut. Precise axial centering with the shaft must be maintained. As will be explained further when the stop mechanism is discussed, the threaded part 6 must also be positioned so that the axial position versus the angular travel is properly phased with the rotation of the rotary head 4. This is an additional reason to integrally mold the thread in the rotary head 4. The rotor assembly rotates on shaft 7 and is translated by the engagement of thread 6 with a stationary nut . The unit moves as a single rigid assembly so that other belts, gear, pulleys, pivots, levers or flexible couplings are not required.

Figure 6:
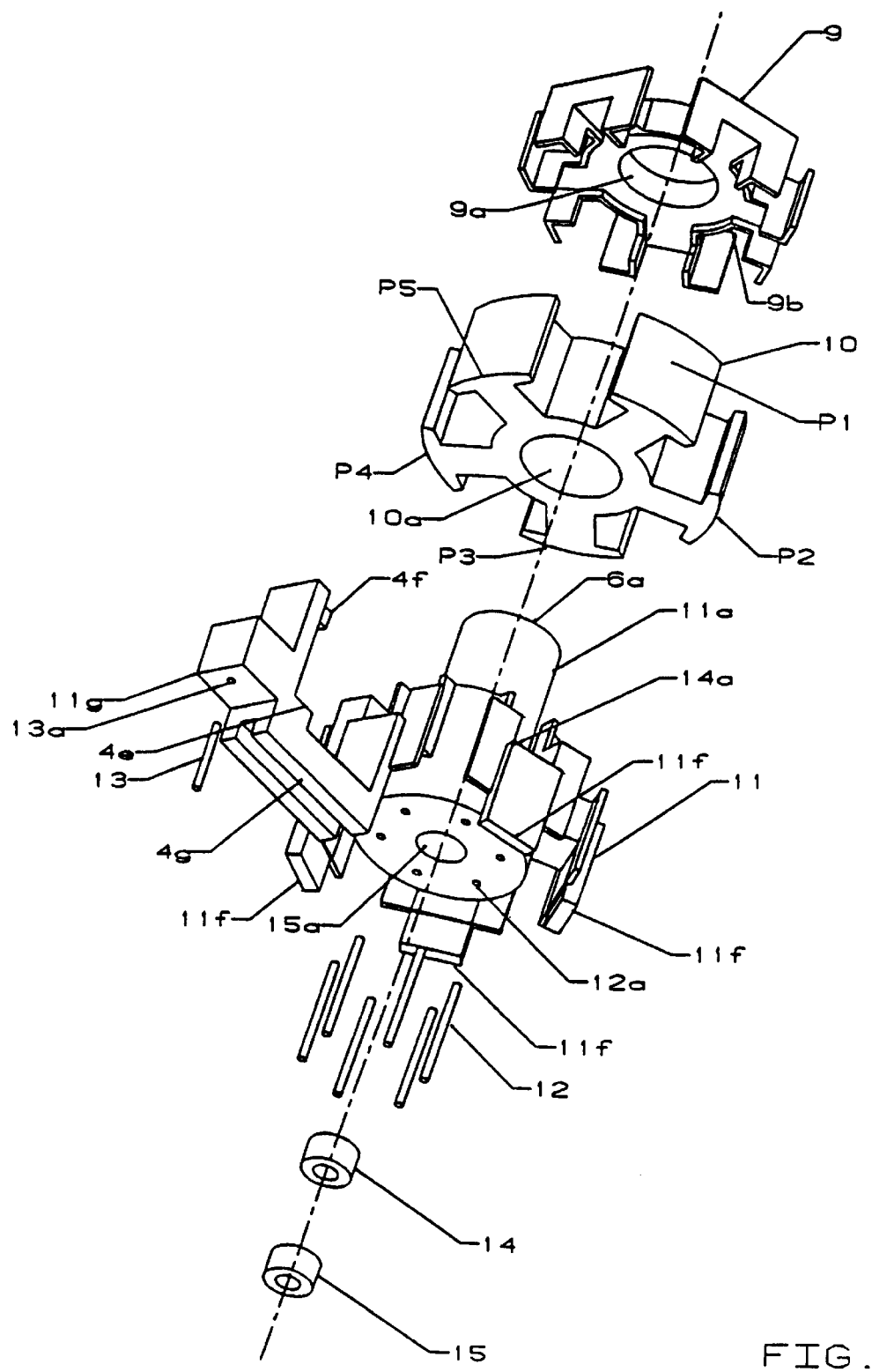
FIG. 6 is an exploded view of the motor bearing and stator assembly.
Figures 7, 7A:
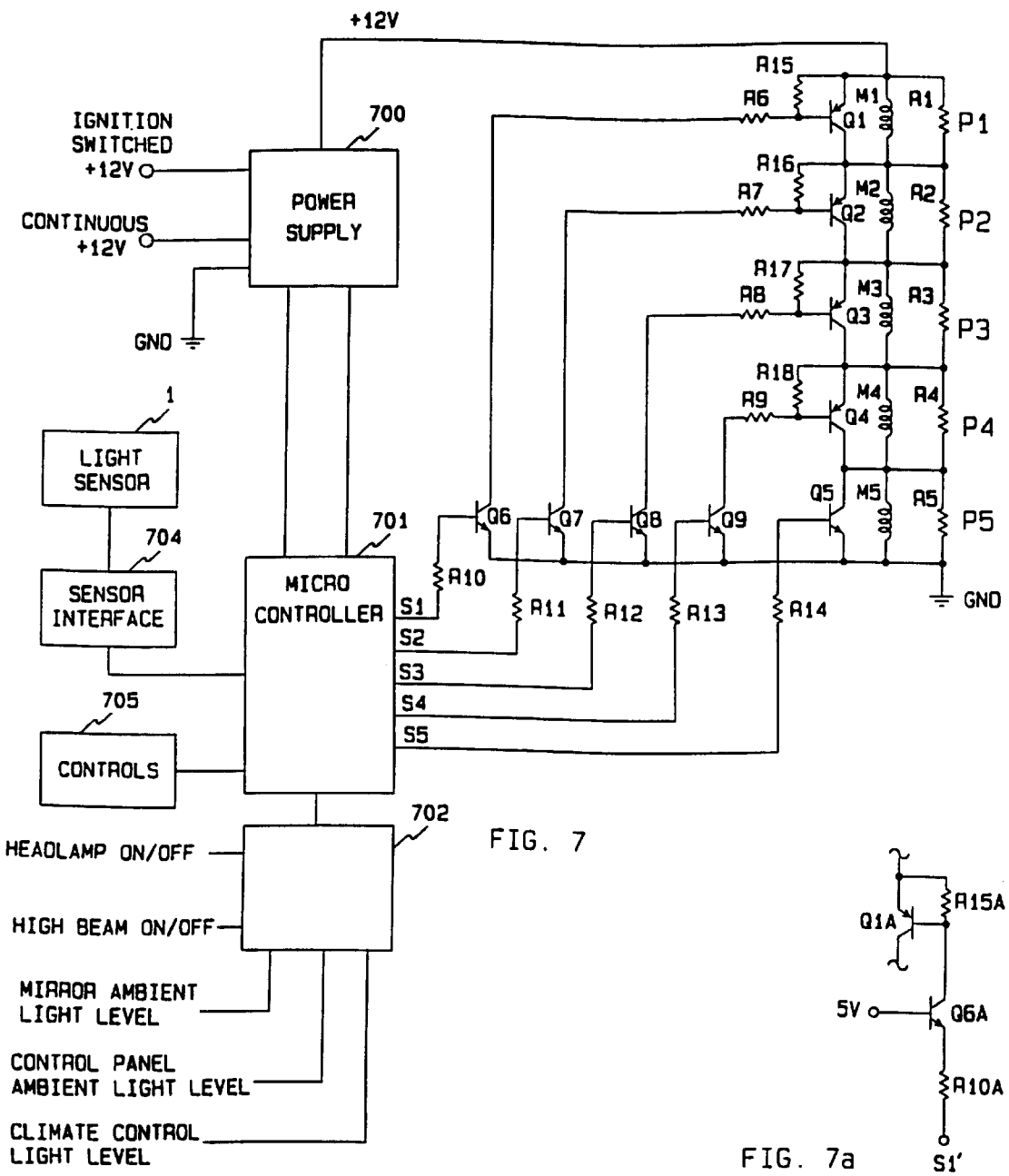
FIG. 7 is a schematic block diagram of the electrical control circuit which details the stepping motor winding and drive configuration.
FIG. 7a is an optional shorting circuit for one of the series pole face windings.

The stator and bearing assembly are depicted by the components 9 through 15 shown both in FIG. 2 and from a different perspective in FIG. 6. The component 10 is a stack of stamped laminations which provide five poles of modest but reasonable width and which are designed to provide maximal access for easy winding consistent with their size and magnetic performance. The lamination stack 10 is placed on molded plastic part 11 so the cylindrical portion 11*a* of part 11 extends through circular hole 10*a* in the lamination stack. Plastic part 9*a* is placed on top of laminations 10 so that 11*a* also extends through hole 9*a*. Together parts 9 and 11 nest with the laminations 10 so that they form the top and bottom portions of insulating bobbin type winding coil forms for each of the five poles of lamination stack 10. Projection 11*d*, visible in FIG. 2, keys with opening 9*b* in part 9, visible in FIG. 6. Together with the laminations, this combination serves to key the nested assembly together so that, if rattling is not a problem, the windings should serve to secure the unit together. Bonding of lamination stack 10 to form a solid unit, alternative construction using a single piece for 10, or the addition of other mechanical fastening means to hold the stator assembly together are all reasonable options. The six pins shown at 12 are pressed into the holes 12*a* of the part 11 and pin 13 is pressed into hole 13*a* of part 11. The winding is then added. As shown in FIG. 7, the winding is made as one continuous winding having sections M1 through M5 which are placed in series. Each of these windings sections M1 through M5 are wound in the same direction around corresponding poles P1 through P5. The two ends of the winding and the four intermediate taps between adjacent pole face windings are connected one each to the six pins labeled as part 12. Thus the winding can be applied as one unbroken piece of magnet wire which is wrapped around respective pins at the start and end of winding and also between the winding of each pole.

The mating nut 6*a* for the screw 6 is integrally formed in the top of plastic part 11. Because of the need for precise axial alignment of the nut and shaft, it is preferable to integrally form this thread in part 11. This does, however, require that the material in part 11 serve as a low friction, good wearing part in addition to its other mechanical requirements. The nut may alternatively be of a separate piece of material. Furthermore, the nut may be flexibly constrained especially allowing some radial compliance so that it self centers with the thread. These are reasonable options but a plastic which meets the combined mechanical requirements and a design using a single part will yield the most reliable and cost effective part. Acetal which does not have an abrasive fill is the best material known to the inventors. A Teflon® fill in the acetal plastic may be used to decrease friction. The nut as well as the thread should be carefully modified to permit adequate radial clearances. Since a rotational speed of several revolutions per second is normally adequate, the wear problems are not nearly as severe as for rapidly moving parts.

The bearings 14 and 15 are inserted and spaced in the cylindrical opening 15*a* below the threaded portion at 6*a*. Shaft 7 revolves and translates in these bearings and they guide screw 6 in nut 6*a* which causes the translational motion. Bearings 14 and 15 are spaced as far apart as possible consistent with constraints that they must remain housed in the part; that the bearing 14 must allow axial clearance for screw 6 when it is in its lowest position; and that the shaft 7 must not slide out of bearing 15 when it is in its highest position. The view is simplified. Shoulders, spacing sleeves, and/or retainers may be added as needed to retain the bearings in proper position. The internal screw thread at 6*a* and the inner cylindrical portion 15*a* which holds the bearings are preferably molded over a common mold insert so that axial alignment can be precisely maintained. A press fit would be the easiest way to retain the bearings but because of conflicts between fill materials which would enhance the dimensional stability of the plastic and the wearing and frictional properties of the molded in nut, it is preferable to mechanically retain the bearings 14 and 15.

In use the rotor assembly, components 4 through 8, is stepped in known increments under the control of the micro controller so that once its position is known, it becomes a simple matter of maintaining an up/down count in the micro controller program to keep track of the rotor position. It is desirable to initially establish the rotor home position when the controller is turned on and initialized and it is expedient to occasionally re-establish the home position to correct for any possible errors in the stepping positional response. The easiest and least costly method to establish the home position is to run the rotor for enough steps in one direction that it is certain to have reached the end stop and to have been stalled and held in position by the end stop for the remaining steps. The controller then reverses the direction to move the rotor away from the end stop and keeps track of its position by maintaining an up/down count of the number of steps that the rotor is from the end stop used to establish the home position. Besides the need to establish the initial home position, the end stop or stops serve the purpose to keep the rotor from being driven to an inoperable position in the event of a temporary program error condition which might cause the unit to be driven beyond its normal positional range. If the rotor is not driven to an inoperable position, it is likely that the unit can detect that responses are not appropriate (for example, unusually high or variable blocked light sensor readings) and force an initialization and re-homing sequence before serious damage is done. Without the end stops, the unit would be likely to jam, and repair would be required to free the jam. It is critically important that the stops be reliable and non-jamming. The tab 4*d* on the rotary head 4 and the tabs 4*e* and 4*f* extending from the arm projecting from part 11 serve this purpose. The unit is designed to revolve 5 turns thereby translating 1 millimeter per turn for a total of 5 millimeters of travel between stops. For clockwise rotation viewed from the top, tab 4*d* rotates and travels incrementally downward 1 millimeter at a time with each completed revolution until it hits stop 4*e* from the side not axially. This is an important feature that the stops are designed to first stop the rotary movement which as a secondary result stops the axial translation as well. If the motion was blocked in the axial direction instead, the screw would tighten and be likely to bind. Also, the rotational position would be indefinite depending on the tolerances of the screw threads verses the stop and on the degree of tightening. For counterclockwise rotation tab 4*d* travels upward in a helical path until it strikes tab 4*f*. Implementation of the rotary stops is where care must be used in the positioning of the screw and in the relative spacing and in the accuracy and stability of the positioning of the stop tabs. The dimensioning is controlled so that on the downward path tab 4*d* adequately clears (this can be a nominal clearance of 0.4 millimeters.) tab 4*e* on the last revolution before engaging the stop but then squarely engages it (this can be a nominal overlap of 0.6 millimeter.) on its final revolution as tab 4*d* engages tab 4*e*. With the correct spacing between tab 4*e* and tab 4*f* relative to the screw thread pitch and the height of tab 4*d*, a similar requirement is met as the screw rotates to its counterclockwise extreme and tab 4*d* engages stop tab 4*f*. In order to stabilize the position of the tabs, the arm which holds tabs 4*e* and 4*f* is attached to part 11 and it is also attached to the printed circuit board by post 13.

To assemble the rotor assembly to the stator assembly, the lower end of shaft 7 is inserted through thread end 6*a* of the stator assembly and slid into the bearings 14 and 15. Then the threaded portion 6 is screwed into the nut 6*a*. Before attachment to the printed circuit board, the stop 4*f* is easily sprung out of the way to screw the rotor unit into its proper position with moving stop 4*d* between stationary stops 4*e* and 4*f*.

The circuit board (not shown) has 7 holes and solder pads and also provides the needed electrical connections to these pads. The board also contains a cutout to clear the arm 4*g* and the shaft 7 which may extend slightly through the circuit board when the rotor is at the lower stop position. The unit is inserted into the printed circuit board until the four legs 11*f* and the bottom 11*g* of the stop leg are firmly seated against the printed circuit board and the legs are soldered in place. Optionally, if the proper stop clearance cannot be controlled dimensionally, the surface 11*g* can be designed to ride slightly above the surface of the printed board and the arm can be adjusted for proper stop clearance before leg 13 is soldered into place. Note here that the simple round terminal posts shown are a simplification. In practice the posts would preferably have at least some serrations to grip the plastic and ideally would be stamped from a piece having a larger cross-section and serrations in the plastic pockets so that they would not heat and deform the plastic too much during soldering. The stamped parts could also facilitate positioning of the coil winding wire terminations during the winding and soldering process. It is particularly important that the positioning attachment of the stop leg at 13 be stable.

General Optical Structure Description

In use there are six general rotor positions or positional ranges for each revolution for which light readings may be taken. Depending on the mode of operation, not every reading needs to be taken on every revolution and often the unit will operate in modes where only one or a small number of the five revolutions will be used. Also, many of the readings will be taken when the rotor is in motion so that reading positions do not need to exactly correspond to the step positions. The step positions should, however, be positioned symmetrically with respect to the two color filter positions so that both position and rotational velocity can be duplicated as well as possible for corresponding measurements of the same viewing frame for each of the two colors. Furthermore, other designs or emphasis may require a different number of color selections, three for example. Placement of too many mirrors around the head does raise problems with signal cross talk and requires added care in separation of the signals. Many inventive features are also still present in a design which uses only one reflector which is optionally uncolored without the use of the color selection. Also the two color design can use one substantially clear reflector and subtract the color filtered signal from the substantially non color filtered one to get the complementary component or use a processing algorithm which does not use the directly complementary color component. Modifications of the types described are considered to be within the scope of the invention. In practice the head is panned back and forth only through the rotational range which includes the positions at which readings are taken. Many readings can be taken for travel in each direction so this transit time is not lost by taking readings for only one direction and then doing nothing during the return in the reverse direction. While panning through the headlamp dimmer's angular sensing range, the interval between readings for successive frames of a given color may be relatively small, even in the millisecond range. The rate of panning may vary substantially with mode of use but, very roughly, a set of readings for one back and forth cycle will be repeated in a range of once every several seconds to several times a second. The rate may be adjusted even during a particular cycle depending on conditions. For example, the portion of the scan used to detect the most distant tail lamps may be slowed. Slower panning may permit more settling time and permit additional readings to be taken and averaged to at least in part offset limitations in sensor noise and response speed for very low signal levels. It is a fortunate coincidence that the response speed normally required for the above type of measurement tends to be correspondingly low. The typical situation where the greatest sensitivity is required is in overtaking a vehicle which is a substantial distance ahead in a circumstance with dark surroundings. These are the circumstances under which the driver in the leading vehicle will be most bothered by headlamp glare from the rear and for which the most distant and, therefore the dimmest lights, must be sensed. Things generally happen much faster for oncoming headlamps, and fortunately, the available light levels are also greater permitting faster response. The above considerations make it prudent to utilize some loss in contrast in the lens 2 to advantage. First, the loss in contrast is normally due to light from a bright image being scattered over into another dimmer viewing area by reflections or light scattering from optical surfaces of the lenses, mirrors, filters, or portions of the case into which the light is projected. With the measuring system the effect is to have very high sensitivity in the area which is directly projected onto the sensor but to also respond more weakly to scattered light from strong signals not directly in the field of view. The constructive use of a prudent amount of scattering will allow sensing of scattered light from bright oncoming headlamps which rather suddenly come into view before the unit has had time in its current scanning mode to pan to the place needed to directly view the bright oncoming headlamp source. In such situations, the unit may respond by dimming the controlled headlamps immediately or may verify the increased light readings by terminating the relatively slow search for weak tail lamps to perform a more rapid scan for the source of the increased background light level so that when it is required the appropriate dimming may take place without undue delay. It should be understood that the scattered light in the unit must be held to a reasonably low level and the forgoing discussion is not intended to contradict prior suggestions such as the one to use baffles to reduce the scattered or stray light. The point is that the difference in received light level between dim, distant tail lamps and modestly close oncoming headlamps is huge and in this instance, the reading from even a modest amount of scattered light in the unit will be enough to achieve the stated objective. The control sequence is arranged so that during operation the mirrors are not allowed to dwell in a position range close to that shown in FIG. 3 or the corresponding position range 180 degrees away when the mirror 4*b* is aligned to reflect light which is focused by the lens 2. As a result there is no chance to focus the sun's direct rays on the sensor for a prolonged period of time thereby risking damage to the sensor. In fact the rotor is allowed to come to rest only in a position where light coming through the lens is substantially blocked by one of the baffles 4c. This blockage occurs well before the light rays reach their focal point so there is no danger of seriously overheating other surfaces either. The rotor is also moved to a position where the baffles 4c block light from the lens 2 before the circuit de-energizes itself after the ignition is turned off. This prevents risk of damage due to focusing the sun's rays when the unit is turned off and the vehicle is idle.

With these general understandings, the use of the rotational positions and the translation feature will be described in more detail. For the first half, 180 degrees of rotation, of one revolution of the assembly, there are three positions approximately 60 degrees apart which yield readings for one of the two color filter selections. For the remaining 180 degrees of the revolution there are three similarly spaced corresponding positions for the other color filter selection. There are also up to 5 revolutions which generally repeat the 6 positions per revolution but for which the elevational viewing angle of the light sensitive area for the headlamp dimmer increases by about one and one half degrees for each revolution of the assembly toward its lower stop. Note that the 3¼ degree frame size stays nearly constant but the elevational position of the whole frame changes. Focus is affected by the translation of the rotor assembly and the unit is designed for best focus when the unit is approximately in the middle of the translational range so that focus is still acceptable at both extremes of the translational range.

Figure 3:
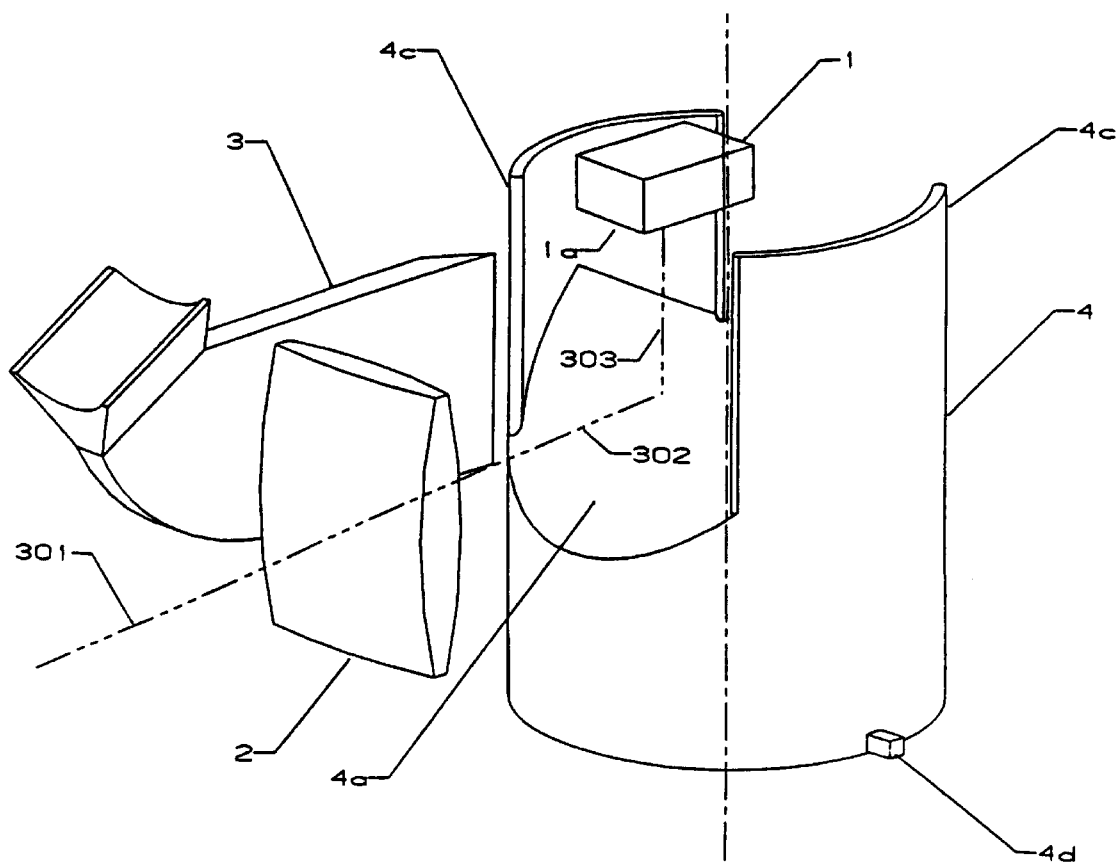
FIG. 3 is a view of the optical structure and rotary sensing head positioned to sense light for the headlamp dimmer function.
Figure 4:
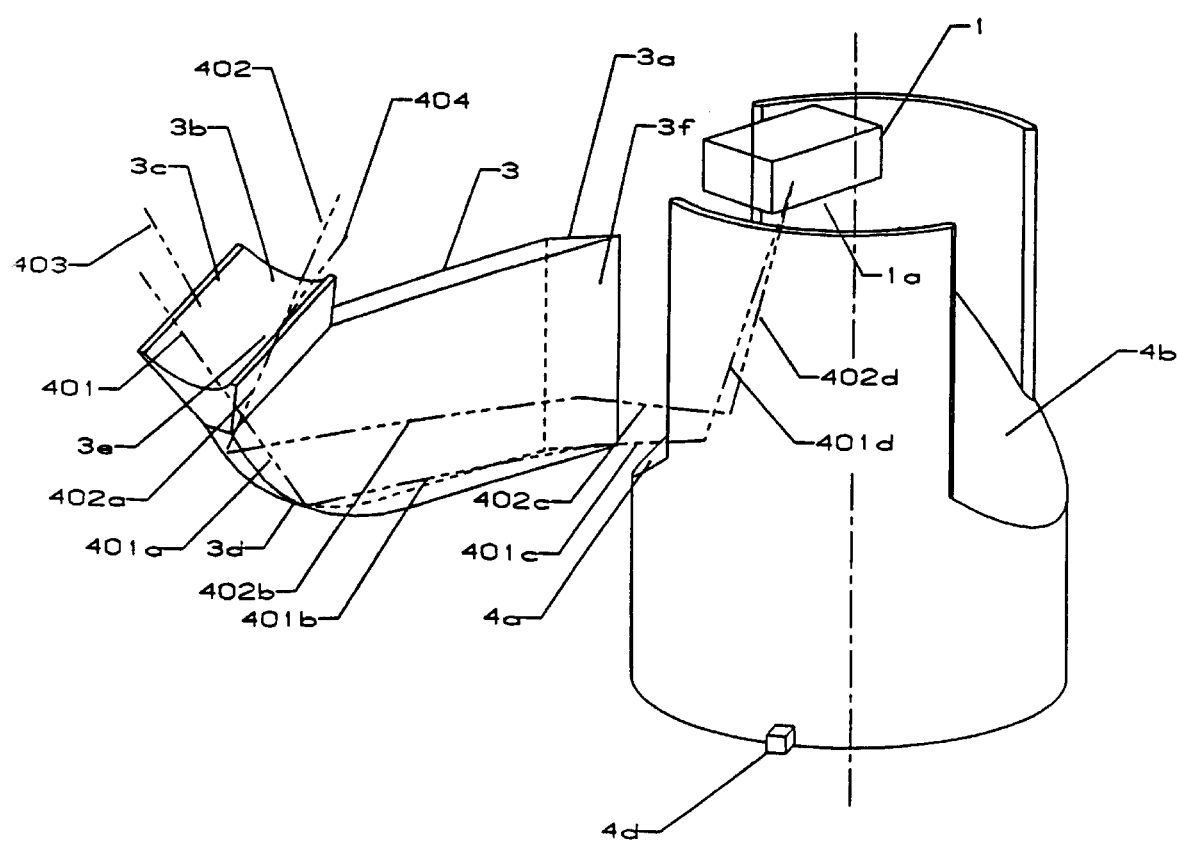
FIG. 4 is a view of the optical structure and rotary sensing head positioned to sense light for the headlamp on/off function.
Figure 5:
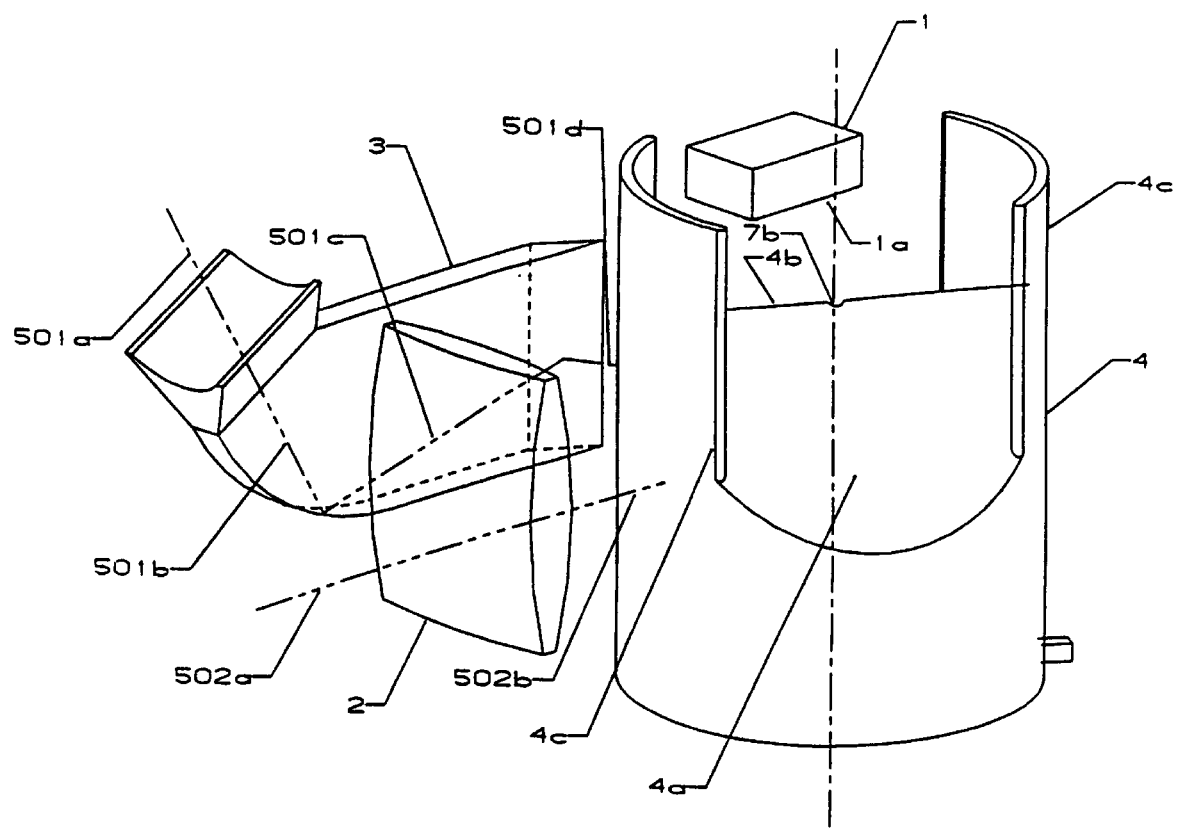
FIG. 5 is a view of the optical structure and rotary sensing head positioned to take a reading when most of the light to the sensor is blocked.

FIGS. 3, 4, and 5 show the sensing head in viewing positions from the first half revolution for taking readings for the headlamp dimmer, for the headlamp on/off sky sensor, and for the blocked light condition, respectively, with the red reflecting filter mirror 4a in the operational position. There is a second red complement or cyan reflecting filter mirror 4b which assumes three additional positions during the second half revolution. Portions of both of the filter mirrors 4a and 4b are visible from the perspective shown in FIG. 4. The general operation is identical for measurements taken with 4b in place of 4a and the appearance of the FIGS. 3, 4 and 5 is nearly identical to the appearance when readings are taken with 4a except that 4a and 4b are interchanged and the tab 4d is not visible. Thus figures are not included to show the positions for readings taken with the filter 4b. The mirror 4b is not placed in an exactly symmetrical position to 4a but is offset just enough to compensate for the 0.5 millimeter of axial movement caused by the half turn of travel between the corresponding measurement positions for the two filters. In this way the field of view for each reading with the 4b filter more closely registers with the corresponding field of view for the corresponding measurement taken one half revolution away with the 4a filter. That offset has been established so that when readings are taken with the filter 4a, the corresponding readings with 4b are taken with a rotational increment of precisely 180 degrees in a direction to advance the rotor away from home stop 4e. Note that the mirror 4b could have been offset the other way to compensate for the half revolution of travel. Then the corresponding fields of view for 4b would be for a 180 degree increment of rotation in a direction advancing the rotor toward rather than away from the home stop 4e. The choice constitutes a sort of date line for the rotation and should be chosen to correlate with the end stop position to avoid having portions of the rotation next to the end stop for which it is not possible to rotate to the corresponding frame of the other color selection and stay within the end stop limits. This is an important point because color determinations are made by comparing the readings taken with the filter 4a with those of corresponding location taken with the filter 4b. The more nearly the viewing frames for the corresponding color frames register, the more accurate the readings will be.

Headlamp Dimmer Specialized Sensing Function

Referring to FIG. 3, the rotary head 4 is in the position to read light levels for the headlamp dimmer. Ray 301 is a representative ray from the front and may for example emanate from the headlamps of an oncoming automobile, from the tail lamps of a leading vehicle, or may be a light ray reflected back from the automobile's own headlamps. The ray passes through the lens 2 and is focused as ray 302 which continues to the mirror 4a which consists of a red transmitting filter with a reflective back. The combination reflector and filter 4a is constructed by applying a reflective surface on the second surface side of either a glass or a plastic red transmissive filter. The filter is then secured in the rotary head 4 in the position shown. The filter 4b is fabricated and secured in a similar fashion. Incoming ray 302 then makes two passes through the filter material, one on its way to and a second on its way from the second surface reflecting surface. The red component of the ray 302 is reflected and continues as ray 303 which strikes the light sensitive area 1a of the sensor 1. The lens 2 has a focal length of about 40 millimeters and is focused on the silicon sensing area 1a of the sensor 1 when the rotor is in its nominal center position. The sensor 1 has an active area 1a about 0.090 inches on a side giving the device an instantaneous field of view which spans about three and one quarter degrees in both the horizontal and the vertical directions when used with the 40 millimeter focal length lens. Note that the function of the lens is to bring substantially all of the rays emanating from a given viewing area in the field of view to focus in a corresponding area on the focal plane at the sensor surface. Thus the amount of light collected from a particular light and projected onto the sensor is directly dependent on the light receiving area of the lens 2. Whenever a light source in the field of view is small enough to project as one image on the active area of the sensor, the light level read from this image will include the reading of the color component from essentially all of the rays from the object which fall on the lens. An infrared rejecting filter is optionally included as part of the sensor 1. It may be added just in front of the light sensitive aperture of the purchased sensor, purchased as part of the sensor, or the sensor may be of a type which is not sensitive to infrared. As an option, the infrared filtering can be included as part of the mirrors 4a and 4b. Rejection of the infrared is not absolutely necessary but greatly enhances the ability to distinguish color. As a negative, much of the energy detected by a silicon sensor is in the infrared part of the spectrum so the already small sensor signals are even much smaller. These factors must be balanced in the choice to reject the infrared wavelength component and in the choice of filter pass bands for the optical visible range light also. The first surface reflection of about 4 percent off of the front surface of the combined filter and mirror 4a is not color filtered. In most cases this should be permissible. Options to avoid or minimize this unfiltered component are to use an anti-reflective coating on the face of the mirror 4a, to use a red selective first surface reflector instead of the second surface reflector, or to replace the reflecting filter 4a with a non-colored first or second surface reflector and to mount a filter which generally conforms to the outer cylindrical shape of the rotor head 4 so that it spans the opening between the two baffles 4c and so that light rays entering from the lens 2 or the light pipe 3 pass through it once on their way to the mirror 4a. A similar cyan filter is then provided for the mirror 4b. The sensor is preferably an integrated photo-diode and amplifier combination such as an automotive temperature range version of the Burr-Brown OPT201 combined photo-diode and amplifier supplied by Burr-Brown Corporation of Tucson, Ariz.

The viewing area is panned about 10 degrees to each side of the center viewing position which is shown as the head 4 is rotated by about 25 degrees to each side of the position shown. Thus, successive readings of the output of the sensor 1 are taken as the sensor head 4 rotates through an angular excursion of about 50 degrees beginning about 25 degrees before the position is reached and extending about 25 degrees after the position is passed. The path of the scanned viewing area remains reasonably close to the horizontal and the sensitivity falls off some toward each extreme of the 50 degree rotational range because the baffles 4c begin to interrupt the light coming from the lens 2. The moving baffles 4c serve to substantially block light which enters from the light guide 3 during the scanning operation just described where light entering through the lens 2 is being measured. Likewise the baffles 4c serve to block light entering the lens 2 when the rotor head 4 is in position to read the light from the light guide 3 and to block light from both sources when the rotor head 4 is in the position to block light from both sources. It should be understood that for simplicity only the more complex rotary baffle is shown. In practice a number of additional stationary baffles should be added, for example, one directly around the light sensing aperture 1a of the sensor 1 would help considerably to reduce stray light readings. The general rule for placement of the baffles is to avoid interfering with mechanical motion and with the primary optical paths but otherwise use baffles wherever they are helpful enough to be economically prudent to add. Scattered light sources coming in at divergent angles and hitting the lens 2 can be particularly troubling. Some external shading of the lens 2 by projections from the case 100 in combination with added inside baffles is prudent and anti reflective coating of the lens would be helpful if needed enough to be economically justifiable.

Similar successive readings which form matching pairs with corresponding readings taken with the red filter 4a are taken for the cyan filter 4b when the rotor head 4 rotates through a range of angles displaced by 180 degrees from the range just covered. The above description applies generally except that the word red is replaced with cyan which here refers to a filter which rejects red and transmits or reflects visible colors which are complementary to red.

At night when the headlamps are in operation, the desired elevational angle for the headlamp dimmer sensor will be established by selecting the number of turns to revolve the head 4 from its home stop position and the amount of vertical panning used will be determined by the number of revolutions over which light level readings are taken. The elevational viewing angle changes by about one and one half degrees with each revolution of the head. Thus, there is approximately 50 percent overlap in the viewing frames from one revolution to the next. Between the horizontal panning capability and the five vertically spaced scan lines it is possible to completely cover a viewing field which is about 9 degrees high by about 20 degrees wide. In what follows, the nominal three and one quarter degree approximately square viewing field or frame which is projected onto the sensor's active area and for which a reading is taken will be referred to as a reading frame. Using this terminology, the approximate 50 percent overlap in viewing frames from one revolution to the next, means that there is a corresponding 50 percent overlap in two reading frames when the second reading frame is taken when the head 4 has revolved exactly one revolution from the position where the first reading frame was taken. The overlap in the horizontal direction can be adjusted to any desired amount by changing the rotational increment of the position of the rotor head 4 for which readings of the light level are taken. A small rotational increment of the head 4 between reading frames results in many reading frames with large overlap and too large a rotational increment results in viewing gaps between the reading frames. Each reading frame is taken with a field of view which is only about 6 percent of the total field of view. Thus, for example, for a large area diffuse light sources from the automobiles own headlamps which is reflected back from snow covered ground, the reading with the small area sensor may be less than a tenth of the reading averaged over the whole area. On the other hand, the tail lamps of an automobile several hundred feet ahead should all be visible in one of the 3¼ degree by 3¼ degree frames and the reading for this frame should be substantially the same as a reading of the tail lamp light level taken over the entire 9 degree by 20 degree frame. This is true because essentially all of the light from the tail lamps is projected into the one frame. Here the overlapping frames enhance the ability to capture a reading for the frame where the lens 2 projects light from all of the tail lamps onto the single sensor reading frame. This makes it possible to detect the tail lamps with greater sensitivity and uniformity than if their light is split between adjacent non overlapping frames or worse yet lost in gaps between frames. The result of doing the overlapped scanning then is to raise the ability to distinguish the headlamps from a diffuse background light level by about ten to one on the basis of intensity alone. When the capability to check that the lights are red is added, this advantage is even greater. The micro controller is programmed to respond to the lowest light levels only when they are from red lights. This screens out many low intensity, non-red light sources which would otherwise be confused with dim tail lamps and cause nuisance dimming when operating at the very high sensitivities required to respond to the red tail lamps in time.

Headlamp On/Off Specialized Sensing Function

Referring to FIG. 4, the lens 2 is not actually removed from the assembly during operation but for visual clarity has not been shown in FIG. 4 to permit an unobstructed view of the light guide 3. The rotary head 4 has been rotated 60 degrees from the position shown in FIG. 3 and is in position to sense the red light component of the skylight. In this position the large area, cylindrical, negative focal length lens 3b of the light guide 3 directs some representative rays into the light guide from a large viewing area of the sky. Note that the cylindrical entrance lens was convenient here because of the geometry but other lens geometries including more conventional spherical or aspherical ones are advantageous in other applications and within the scope of the invention. The light guide has a reflector applied to the surface 3f to reflect rays so that a reasonable percentage are directed along the length of the light guide and are internally reflected off of the sloped end surface 3a. Some of these rays then continue through the light guide sidewall 3d where they project a diffuse area of light on the red reflector 4a which reflects a diffuse pattern of red filtered light toward the aperture 1a of sensor 1. Thus, the red content of the skylight is measured. A fairly low percentage of the light actually reaches the active area 1a of the photo-sensor but this is acceptable because of the relatively high threshold light levels for the headlamp on/off function when compared to the dimmer function. When the rotary head 4 is indexed 180 degrees, operation is similar except that the cyan filter 4b reflects the shorter wavelength non-red light to the sensor.

In normal operation, the micro computer takes the ratio of this cyan band pass filtered (4b) reading of the shorter wavelength visible rays to the red filtered band pass (4a) reading of the longer wavelength visible rays. On a blue sky day, the balance in spectral content is shifted toward the blue end of the visible spectrum and the ratio determined above is substantially higher than on an overcast day. The cyan reading is better than the red reading as the basis for the threshold level to be used to determine when to turn the headlamps on or off. However, the use of a common threshold for both cloudy and clear days even when using a single broadly filtered color component which is better than another color component still has not proven adequate to properly establish the sensitivity for both the clear day and the cloudy day. The color balance measurement which depends on the taking of two or more readings is required. When the ratio determined above is high indicating a blue sky day, a lower light level threshold is used to determine when to turn the lights on or off.

Many variations of the above procedure are possible. In some configurations, the two or more readings required to determine the color balance may be combined implicitly in the sensor perhaps before amplification and effectively the color balance indication may be preprocessed so that only one signal which is directly indicative of the color balance is input to the controller. It should also be understood that more than two color component measurements may be used to determine the spectral color balance and that more than one signal can be used to determine the general skylight level and that these two determinations may or may not be interdependent. Narrower parts of the spectrum may shift in directions which may even be opposite to the general shift toward the shorter wavelength distribution on a clear day. This is particularly true when spectral absorption is changed due to compounds in the atmosphere. The most notable example is that moisture absorbs certain rather broad bands in the infrared. This is the main reason for some emphasis on the use of visible light in the preferred embodiment. Enough moisture is present to cause substantial attenuation in the infrared absorption bands even on some days which are relatively cloud free. Thus, the infrared absorption in itself is not considered to be a good indicator of skylight related driving conditions. However, practically any overcast day will show reduced solar radiation in the bands corresponding to the infrared absorption peaks of moisture. Thus, if the infrared component for wavelengths which correspond to these absorption bands are to be used in the determination of the spectral balance, they should preferably be grouped with the blue visible light and balanced against an overall spectrum or a spectrum in between the blue and the infrared. This is because the general tendency is for relative radiation intensity to be diminished in both the infrared moisture absorption bands and the short wavelength visible bands on cloudy days. A system which lumps infrared with short wavelength light may still work in accord with the principles of his invention but it is not preferred.

An alternate statement for the control operating characteristic for the case where the color balance is determined on the basis of at least two separate readings is as follows: The headlamp on/off controller applies a given functional relationship to at least two skylight readings taken by applying different color filters or color responses to the skylight readings to determine the relative spectral distribution of the skylight. An indication of a distribution which is strong in shorter wavelengths is indicative of a clearer, blue sky day. A skylight reading or combination of readings is also used to determine the indicated skylight level. The functional response of the controller is characterized in that the operating headlamp turn on and/or turn off threshold is at least in part based on the indicated skylight level and also on the relative skylight spectral distribution. The operating threshold based on the indicated skylight level will generally be made lower when a spectral distribution indicative of clear, blue sky conditions is indicated by the given functional relationship. The spectral distribution indicative of clear sky is one which has a greater amount of shorter wavelength light in the distribution. Certain parts of the infrared part of the spectrum which are absorbed by moisture are preferably rejected or grouped with the short wavelength visible reading because a decrease in their intensity relative to the rest of the spectrum is also indicative of conditions which tend to be overcast.

In another case where a signal directly indicative of the color balance is used, the control operating characteristic is as follows: The controller utilizes two or more signals, a first given signal indicative of the shorter to the longer wavelength color balance of the skylight and a second given signal or combination of signals indicative of the skylight intensity. The controller establishes an operating threshold for the headlamp on to off operation and/or the headlamp off to on operation which is at least in part related to the two given signals or signal combinations. The functional relationship between the signals is such that for a higher short wavelength to long wavelength color balance generally indicative of a clear day, the operational light level threshold based on the indicated skylight level will be adjusted based on the indicated color balance. The nature of the adjustment will be to generally decrease the operating headlamp on to off or off to on threshold as the short wavelength to long wavelength color distribution increases.

In practice, in order to limit unwanted frequent switching of the lights between on and off, various filtering and/or time delaying options may be used in addition to the threshold determination referred to above and hysteresis may be added to modify the turn on threshold relative to the turn off threshold. It is intended that the base threshold be measured in a common sense way and not in a way which would use time averaging, delaying or hysteresis effects to mask the effective operating threshold of the control.

A copending application, assigned to the assignee of the present invention, Ser. No. 08/110,373, filed Aug. 23, 1993, and incorporated herein in its entirety by reference contains related details on the light pipe structure. The concave entrance lens 3b of the light guide 3 is directed to receive light from the sky through the windshield of the vehicle. A feature which needs to be emphasized over the emphasis given in the copending application, Ser. No. 08/110,373, is that, with appropriate design, the larger entrance lens area relative to the general cross section area of the light guide enhances the pickup pattern and allows a greater light intensity to be directed into the light pipe or light guide. In support of this point, with the concave entrance lens design the sloped side 3c extends beyond the general cross sectional outline of the rectangular light guide cross section. The ray 403 striking this side of the entrance lens from a divergent angle as illustrated is refracted to a direction more nearly parallel with the perpendicular center axis of the light guide entrance lens so that it is captured. Likewise the ray 404 entering from a divergent angle from the opposite side as illustrated is also refracted toward the center axis of the light guide so that it can enter the light guide. Neither ray would be likely to have been directed into the light guide at an angle for which it would be transmitted were it not for the concave entrance lens and the edges of the lens which extend beyond the cross-sectional outline of the integrally attached light guide. The rays 401 and 402 are included to illustrate the general path followed through the light guide and in particular to illustrate how the light guide captures rays entering at divergent angles from the front and back. To achieve the desired wide angle viewing area, light is not efficiently focused from the very small viewing field as it is by the lens 2. Instead, a relatively small but representative sample of rays entering over the intended wide angle viewing field must be captured and directed to the exit end of the light guide 3. In this process many other rays are lost. The entrance lens arrangement is generally designed so that rays from the right side of the viewing area are most likely to be captured if they enter the right side of the lens and so on. Design of the entrance lens to conform generally to this mapping criteria between the area on the lens face where the light from a given part of the viewing field enters the lens and the relative efficiency of the system in directing this light into the light guide helps to find a design such as the one illustrated where the larger entrance area and the concave cylindrical lens face are used to capture light from a wide angle input aperture and direct more of it into the light guide. The ray 401 entering the front portion of the viewing area is only mildly refracted and continues as the ray 401a to where it is reflected off of the mirrored surface 3d and continues as the ray 401b. The ray 401b is internally reflected off of the angled end 3a and exits the light guide through the opposite side 3f as the ray 401c. The red component of the ray 401c is reflected off of the mirror 4a as the red component 401d which continues to the aperture 1a of the sensor 1. A similar type of path is illustrated for the ray 402 entering from the back portion of the viewing area. The description of the path parallels that of the ray 401 and will not be repeated. The translational motion caused by the successive revolutions of the rotor head 4 are designed for the headlamp dimming function and have little useful effect for the headlamp on/off function. For consistency it is advisable to choose a particular rotary position to use for the skylight readings.

Blocked Light Sensing Function

In FIG. 5 the rotary head 4 has been turned 60 degrees in the other direction to the position where the light from the light guide 3 and the lens 2 are both blocked. This is the position where the dark reference reading is taken for the red reflector 4a. Since the stray light is different with the red reflector 4a and the cyan reflector 4b, separate dark reference readings are taken at this 4a position and the corresponding position for 4b 180 degrees away. The contribution of stray light to the reference reading also depends somewhat on the translational position so it is prudent to also maintain a separate blocked light reading for any of the five rotary passes which are in use as well as for each color filter. This makes a possible requirement for ten different blocked light readings. If the design is such that the stray light contribution is sufficiently low and relatively unaffected by the filter and/or the revolution, some or all of these redundant readings can be eliminated. It is advisable to perform some averaging and some integrity checks on the blocked light reference readings. Readings that are unexpectedly high should trigger re-initialization and re-homing of the device to restore proper operation in case that the actual rotary step position is different from the one indicated in the micro controller record.

Electrical Control Circuit

FIG. 7 is a block diagram of the micro controller based control circuit with more detail given for the electronic drive circuit for the motor. The micro controller power supply receives power from both the continuous and the ignition switched automotive power supplies. These signals as well as the various signals connected to the control interface 702 may be connected directly to the automobile's wiring or may be routed through other modules such as a rearview mirror package. The power supply module 700 supplies a +12V signal to the series connected stepping motor windings M1 through M5, and supplies +5V to the micro controller 701 and various required voltages to the sensor for its integrated amplifier and to the light sensor interface module. The power supply 700 energizes the above circuits whenever the vehicle ignition is on supplying power on the ignition switched +12V input. The power supply 700 also receives a controlling signal from the micro controller. The power supply 700 continues to supply power from the continuous +12V supply to the micro controller and the stepping motor and interface modules after the Ignition Switched +12V is turned off. The micro controller keeps the headlamps on for an exit delay period as required and indexes the motor rotor 4 to a position where the partition wall 4c of the rotor (See FIG. 2) blocks light entering from the lens 2 before it reaches a focus point so that the lens will not cause damage to the sensor or other components should the vehicle happen to be parked where the sun is in the viewing field of the lens 2. After the tasks are complete, the micro controller sends a signal to the power supply to turn off the supplies including the +12V to the motor and the +5V supply to the micro itself. In some applications, such as for testing or for taking a measurement for the vehicle solar load, it may be necessary to "wake up" the circuit to take measurements or perform some other function. The circuit ground connection GND connects to the automotive ground. The headlamp dimmer and the headlamp on/off control interface includes options to enable or disable the automatic functions along with optional sensitivity and exit delay functions and indicator lights. These functions can be incorporated on a small panel next to the mirror surface of the automobile's rearview mirror or optionally at some other convenient location. The control interface 702 sends and possibly receives signals particularly if the control communicates with other control modules over a communication bus. Signals are sent to turn the vehicle headlamps, tail lamps, and running lamps on and off as required. This automatic command is paralleled by the manual switch which the driver can use to override the headlamp on/off control at any time. Another output controls the high beams and outputs are also available for other modules in the vehicle such as the ambient light signal for a rearview mirror. Other signals used to calculate heat load for the climate control, or to control the intensity of instrument panel lighting are also available. The motor windings M1 through M5 are the windings placed on poles P1 through P5 in FIG. 6. It should be understood that the system can be adapted to work with the pole windings connected in nearly any order if the switching order is appropriately adjusted and if each of the poles are energized to the required polarity by the circuit. For the configuration shown each pole must be energized to the same polarity by the series current from the +12V terminal to the GND terminal. Since description of the switching sequence is easier if each pole in order is connected in series with its neighbor, this is the arrangement assumed for the description which follows. Transistors Q1 through Q5, respectively, short individual windings M1 through M5. Whenever a particular transistor which has been turned on is turned off, the current will be maintained by the inductances of the non shorted windings which are in series. A large voltage spike would occur if it were not for the parallel resistors R1 through R5. The resistors do not eliminate the spike but are sized to limit its peak voltage to an acceptable value. Capacitors or resistor—capacitor networks may be used in place of R1 to R5. Q5 is turned on directly to short winding M5 when output S5 of the micro controller is driven high supplying base current through R14 to Q5 thereby turning on Q5 and diverting current from M5 so that it is no longer driven to its active state. The effective short which is created across M5 does not cause the current in M5 to decay immediately. Instead it decays with an L/R time constant where L and R are the inductance and resistance, respectively, of the shorted winding. Driving output S5 low turns off Q5 and allows the series winding current to energize M5. Shorting of the Q4 is similar except that Q9 is necessary to shift level from the ground based micro controller output S4 to the base of the shorting transistor Q4. Driving S4 high supplies base current through R13 to Q9 which turns on drawing current through current limiting resistor R9 from the base of the pnp shorting transistor Q4 turning it on and shorting the winding M4. When S4 is driven low, Q9 and Q4 both turn off and R18 maintains a near zero voltage at the base of Q4 to assure its complete turn off. The action of the winding inductance and the L/R decay are similar to that already described for M5. The Shorting of M1, M2, and M3 is similar. Resistor R6 is normally made higher resistance than R7, and R7 higher resistance then R8, and R8 higher resistance than R9, the resistance values being sized to cause the flow of adequate but not excessive current to turn on the respective transistors Q1 through Q4.

Adequate steps must be taken to prevent the turn on of all of the transistors at one time or to short circuit current limit the +12V supply to M1 in such a way that damage will not be done if the shorting transistors are all turned on together by a malfunction of the controller. One way to provide reasonable assurance that the windings will not all be shorted at the same time is to provide for the inverted drive of S1 indicated by S1'. In this way, a fault condition in which all of the outputs S1', S2, S3, S4, and S5 are driven high simultaneously will not short Q1. It is much less likely to have S2, S3, and S4, S5 inadvertently driven low and to have S1' simultaneously driven high. In operation the circuit of FIG. 7A replaces R10, Q6, R6, R15, and Q1. and the micro controller is programmed to supply an inverted signal S1' in place of the signal S1. When S1' is pulled low, current is drawn from the emitter of Q6A through current limiting resistor R10A. The base current of Q6A remains small and current from the emitter of Q6A is drawn mainly through the collector of Q6A and thus from the base of Q1A turning it on and shorting winding M1. When the output S1' is driven high by the micro controller, the currents are no longer drawn and the shorting transistor Q1A turns off.

The sensor interface 704 conditions the signal from the light sensor 1 so that digital readings of the sensor output may be read by the micro controller as required. The light sensor 1 is the one depicted also in FIGS. 2, 3, 4, and 5.

Motor Stepping Sequence

FIG. 8 indicates a complete 10 step stepping sequence for the motor. The entry for each step has three sections, first a sequence number which is simply to refer to the step and to keep the steps in their proper cyclic order. It makes little difference which step is listed first, but each step has a definite successor in the cyclic order. The five columns S1 through S5 give the micro controller output drive state for the transistor pole shorting circuit. An "H" indicates that the micro controller outputs a positive voltage to turn on the shorting circuit for the corresponding pole. An "L" indicates that the micro controller outputs a low signal to turn off the shorting circuit for the particular pole so that the winding around it is energized to drive it to its predetermined state. The list with the five columns P1 through P5 lists the polarity to which a pole is driven by the winding which encircles it. An "N" indicates active drive of the winding encircling the indicated pole face to its north pole state. Rather arbitrarily, the north pole magnetic polarity is used for the actively driven poles. A "-" indicates that the pole is not driven by its encircling winding.

There are 10 distinct entries in the list which are identified by index numbers 0 through 9. The first repeated step with index 0 is also included at the bottom of the list. The stepping sequence for rotation in a given positive direction is to start at the present state and to then go to the next state as indicated by the state for the next higher index number until the present state is that shown for index 9 in which case the next state is shown by index 0. For steps in the reverse direction the stepping sequence is the same except the direction in the table is from the present state to the state indicated by the next lower index number until the present state is that shown for index 0 in which case the next state is shown by index 9.

Because the sequence has only ten distinct drive configurations, the rotor can be forced to "jump" to a position some integral multiple of ten steps away which has the same magnetic drive state. For example, the rotor if mechanically forced from its step position will when released jump to the nearest position which corresponds to the one of the 10 magnetic states to which the motor is being driven. This may not be the position from which it was mechanically forced. As another example, if the step position is jumped by 5 steps the motor will not know whether to move five steps ahead or five steps back. If the step position is indexed by two, three, or four steps at a time, the motor will index to the proper position provided that stepping conditions are ideal. The more steps taken at one time, the less margin there is for additional motor displacements caused by load forces, settling times of motor winding currents, or forces due to the rotor or rotor load acceleration. For indexing two steps at a time, there is still reasonable margin to prevent losing step and going to the wrong position.

FIGS. 8 and 9 illustrate that for each of the even numbered steps, three windings are simultaneously energized driving their poles to the north pole polarity with the remaining two poles being shorted. For each of the odd numbered steps, only two of the pole windings are energized, the other three pole windings being shorted. As previously indicated, it is desirable to drive a majority of the poles and also to drive the same number of poles. It is reasonable to double step and use only the even numbered step positions. FIG. 9 lists only the even numbered steps to use for this sequence. As indicated before, the micro controller can switch between various stepping modes to use the one whose particular advantages outweigh its disadvantages for a particular part of the step sequence. It is highly advantageous to use the stepping sequence for which a majority of the poles are energized for many applications. However, with flexibility to change the drive step sequence, it remains an option to use other stepping sequences as desirable.

Alternate Embodiment of Sensing Head

Figure 10:
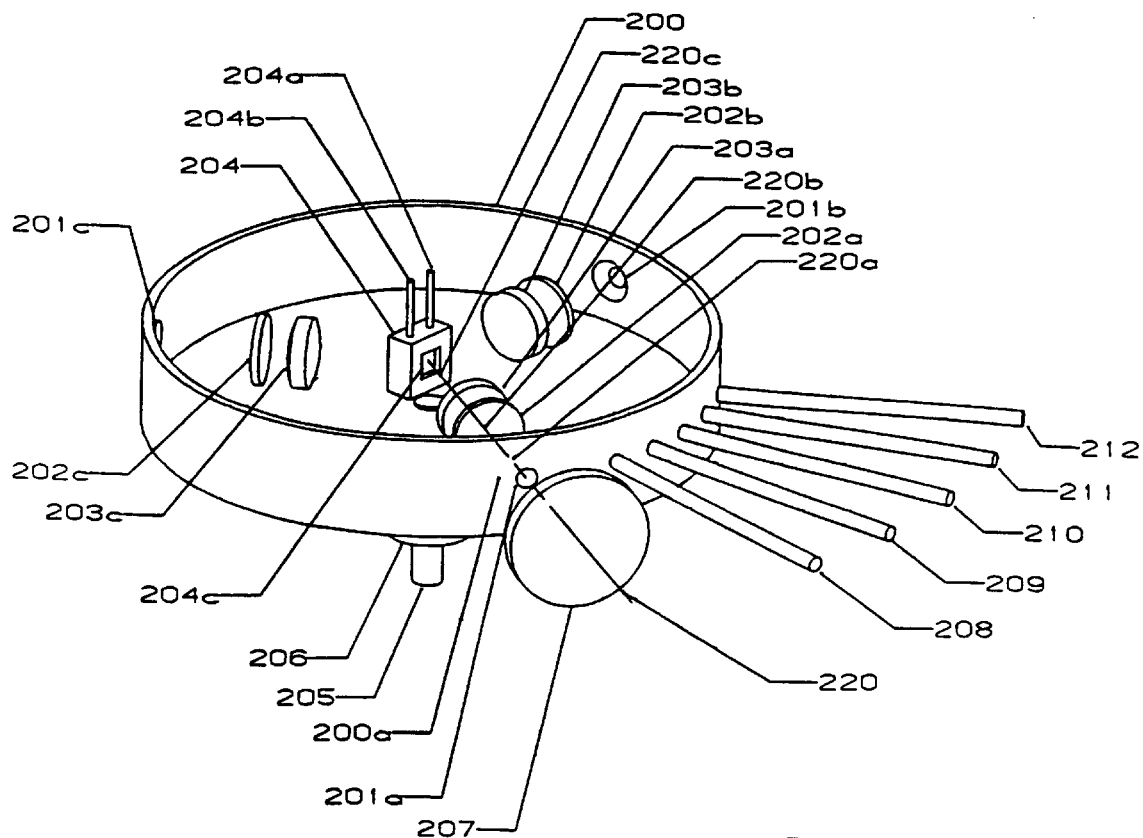
FIG. 10 is a simplified diagram of an alternate embodiment of the electro-optical sensing module which is suited to color measuring applications and which is depicted in a position to sense a light level focused by an external lens.
Figure 10A:
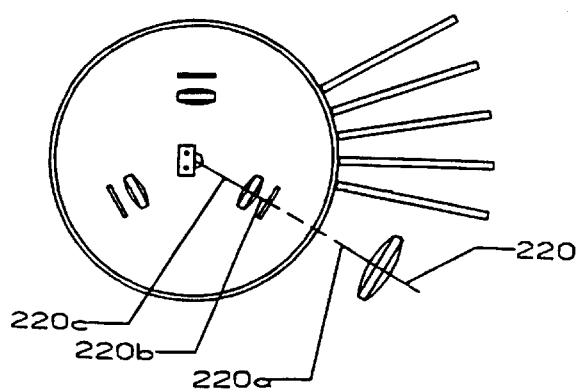
FIG. 10a is a top view of the configuration depicted in FIG. 10.
Figure 11:
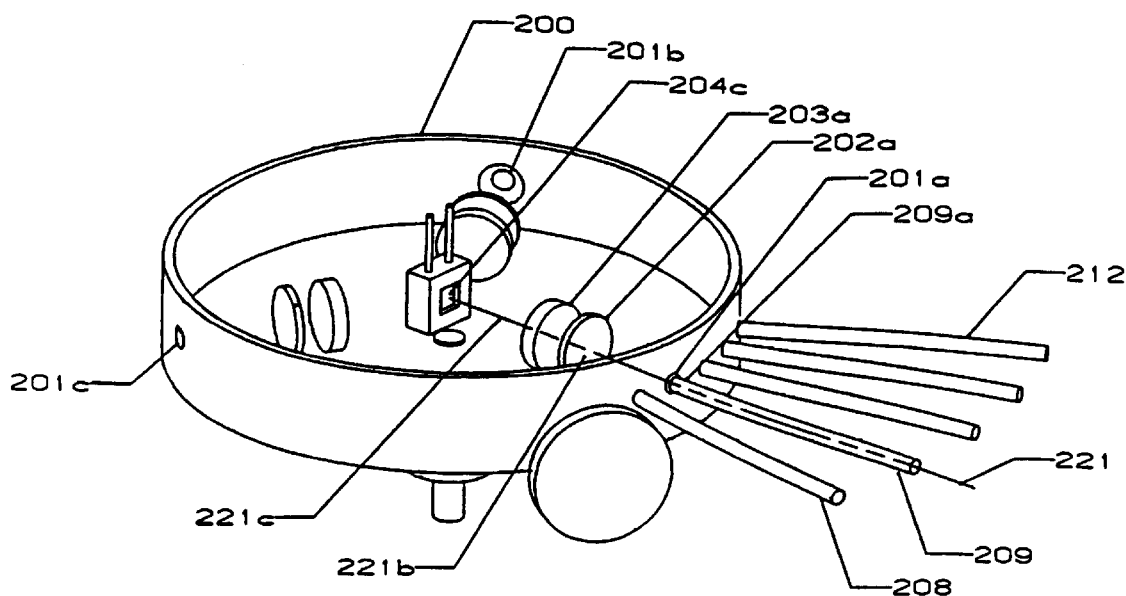
FIG. 11 is a perspective view of the device of FIG. 10 depicted in a position to sense a light level transmitted to the unit by a light pipe.

Referring to FIGS. 10, 10a, 11, and 11a, the unit shown in simplified form is an alternate embodiment of the sensing head 4 of FIG. 2. The head 4 of FIG. 2 has the advantage of compactness and simplicity and ability to operate with a low cost stepping motor having very modest positioning resolution. The head 200 of FIGS. 10 and 11 is best used with a stepping motor or other positioning device with precise angular positioning capability. It has advantages in being capable of multiplexing between many more closely spaced signal sources, of being more adaptable to a larger number of filter selections, and of being capable of efficiently coupling the sensor to light pipes of relatively small diameter. It is also possible to perform a spatial scanning operation with the alternate embodiment. The blocked light reading may also be taken and used to correct for residual reading errors. The alternate embodiment depicted in FIG. 10 is of particular value in such applications as reading color where it is advantageous to couple to one or more light pipes and where it is advantageous to select from a minimum of three filters and to use six or more without serious difficulty in various embodiments. The unit is also adaptable to sample light directly transmitted to a port. This option is not illustrated directly but could be implemented by removing the lens and using the vacated position to allow light from an external source to directly impinge on the port in that position. Appropriate baffles should be added to shield other inputs from the external light source.

In FIG. 10, the cylindrical member 200 is in the rotary position to sense light focused on the aperture 200a by the lens 207, filter it, and project it onto the sensor. In addition to the lens 207, five light pipes, serving as optical signal sources, are arranged around the periphery of the rotary cylindrical member 200 so that the end of any one can be aligned with any of the viewing ports 201a, 201b, or 201c to selectively filter and read the light level emanating from them. The light pipes 208 to 212 and the lens 207 must be correctly aligned and the light pipe ends are preferably close to the cylindrical surface 200 but not touching it so they do not abrade it or impede its rotation. With the close spacing, the ports 201a, 201b, and 201c can be close to a common plane of focus with the light pipe ends and thereby serve as a precise optical sampling frame limiting baffle for the head. With proper focus and alignment of the lenses 203a, 203b, and 203c, the aligned light pipe end or the aligned portion of the image focused by the lens 207 are focused onto the sensor's surface. With such an arrangement, the optical sources may be more numerous and more closely spaced than shown. The sources are arranged so that the angle of the axis of the lens 203a will not deviate from the normal to the sensor by more than 35 degrees for positions for which readings are taken. If fewer sources are used or if it is convenient to space them more closely, it is desirable to minimize the off axis angle between the sensor normal and the axis of a lens when it is aligned to take a measurement.

Figure 11A:
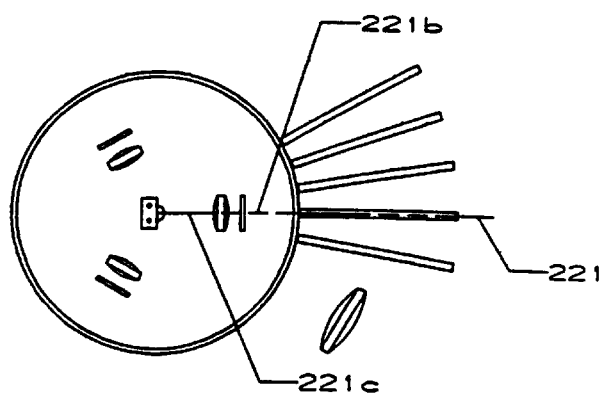
FIG. 11a is a top view of the configuration depicted in FIG. 1.

FIG. 10a is a top view of the configuration of FIG. 10. FIG. 11 is another view of the same device as FIG. 10 for which the rotary head 200 has been rotated so that the optical signal from the end 209a of the light pipe 209 is aligned with the port 201a, filtered by the red filter 202a and focused on the aperture 204c by the lens 203a. FIG. 11a is a top view of the configuration shown in FIG. 11. The rotary head 200 is rotated to align the remaining four light pipes with the aperture 201a in similar fashion. Likewise, the apertures 201b and 201c having green and blue filters, respectively, are rotated into position to read an input signal from any of the six optical signal sources. There is still ample space to position the rotary head 200 so that no optical source is aligned with one of the optical ports 201a, 201b, or 201c and to take a blocked light reading to be used to compensate for residual reading errors.

Referring to FIG. 10 and the related FIG. 10a, the cylindrical unit 200 has a hub 206 which connects to the stepping motor shaft 205. The sensor 204 is preferably a silicon photo-diode having leads 204a and 204b which are connected to an appropriate high sensitivity current to voltage amplifier. If the sensor does not have an integral amplifier it is preferably used with a signal conditioning means which measures its current while maintaining nearly zero volts across it. The sensor or the composite sensor filter module 204 preferably incorporates any filtering such as infrared rejection filtering which is common to all of the light inputs. Filtering needed for all measurements made on a particular signal source can be placed in the optical path of the signal before it reaches an input port of the rotary head 200. The light sensitive window is 204c and the sensor is preferably attached to a printed circuit board and held precisely in its stationary viewing position. The light sensitive area on the sensor must be capable of receiving light from off axis angles large enough to provide for both the off axis rays in the optical system and for the off axis alignment of the signal source reading configurations with the sensor window 204a. The sensing aperture 204c on which light to be sensed is focused is centered on the rotational axis of the rotary cylindrical unit 200. The lens 220 and the five light pipes 208 through 212 are the six light signal inputs. These input sources are normally fixed in stationary positions and are placed so that the aperture 200a is precisely aligned with the end of each of the respective light pipes when a light reading for it is taken. The lenses 203a, 203b, and 203c and the filters 202a, 202b, and 202c are all rigidly attached to and rotate with the cylindrical member 200. For clarity, light baffles have not been shown. In practice, each of the three lens and port assemblies should normally be enclosed by a shroud so that the sensor aperture 204c would be fully shielded from stray light rays from parts of the structure not part of the intended optical path. Such shielding should also be provided at the ports when they are not aligned with an input signal and around input signal sources so they do not interfere one with another. With such shielding, the signals will not interfere to an objectionable degree with one another and the rotary head can be positioned so that light to the viewing ports is adequately blocked to take a blocked light reading.

Only a short portion of each of the light pipes 208 to 212 close to the sensing head is shown. In the complete structure the light pipes are secured mechanically and adequately baffled. In a configuration for a headlamp dimmer, headlamp on/off, and ambient light control, one light pipe is coupled to an entrance lens which has a concave entrance aperture of substantially larger diameter than the light pipe cross section. The entrance aperture is directed toward the sky through the vehicle windshield to detect the skylight. Another light pipe with a similarly designed wide angle aperture is directed through the windshield toward the front of the vehicle to sense the ambient light level. See the aforementioned copending application, Ser. No. 08/110,373 for a discussion of design considerations for sensing heads to direct light into a light pipe from a particular viewing area from which light is to be sampled. Another one or several of the light pipes may be used to sense light rearwardly of the vehicle to detect glare for the purpose of determining when to dim the rearview mirror. The control may have to respond to very low rearward light levels to dim the mirror under some conditions. Since the viewing area is relatively restricted, a convex lens can be used to concentrate the light level which is directed into the light pipe to relatively a modest degree. It must still be realized that in most applications where the sensor must cover even a modestly large viewing angle, the level of light introduced to and transmitted in the light pipe cannot realistically be concentrated to a level which is very many times greater than the level which is sensed. Thus, care must be taken to keep the light pipe diameter large enough to transmit enough light so that a practical measurement can be made by the photo-sensor. The lens 207 can be used for the headlamp dimmer application. Other automotive applications are to direct light from a rain sensor mounted on the windshield. The sensing head of FIGS. 10 and 11 has even greater application in reading light levels for color sensing applications. Lenses or light pipes are two practical ways to couple optical signals to the unit. The red, green, and blue filters and their associated lenses and sensing ports are aligned in turn with a signal source and readings of the color components are taken.

Some of the particular beneficial objectives which may be met singly or in combination are as follows: The blocked light level may be sensed for compensation. Light emanating from a light pipe can be efficiently focused on the sensor. The same sensor can be used with a number of different filter selections. The same sensor with the optional filtering selections and the optional blocked light compensation may be used to read an input from any one of a number of light signal sources which can be coupled to the unit in any of a number of ways including directly, by a lens, or by a light pipe. Furthermore, a number of sources may be multiplexed to the unit so that one or more lenses, one or more direct inputs and/or one or more light pipes may be coupled to the head at the same time. Additionally, the light from the lens, the direct input or from certain light pipe arrays can be spatially scanned. Especially in color sensing applications, the between reading balance gained by using the same sensor and amplifier for reading the various color components not only saves on sensor cost but may substantially increase the accuracy of the measurement by eliminating errors due to sensor separate reading errors of individual sensors.

The lens 203a is aligned to bring the opening 201a at the periphery of the rotary member 200 to focus on the stationary light sensitive area 204c of the light sensor 204. Thus, the lens 203a serves to focus light which is projected on the port opening onto the sensor face. If the lens 203a is made of a high enough F number to capture the cone of light which emanates from the light pipes 208 through 212, it can be very efficient in projecting a substantial proportion of the light which emanates from the light pipe which is aligned for sampling onto the sensor aperture 204c. Light from the aperture 201a first passes through the red filter 202a so that the red component of light from the aperture 201a is projected onto the sensor. It is preferable to make the sensing aperture 204c large enough so that the entire projected image of the aperture 201a falls within the sensing aperture 204c for all of the angular positions for which readings are taken using this aperture.

In FIG. 10, the cylindrical member 200 is shown in the position to read the light level of the portion of the image projected by the lens 207 which falls on the measuring port aperture 201a. This sequence will be described one step at a time. Lens 207 is positioned to focus the light in its intended field of view onto the periphery of the rotary cylindrical member 200. Note that this periphery is the area through which the viewing or sensing ports of the rotary head 200 move. The portion of this projected image which falls on the aperture 201a passes through the filter 202a and is re-focused by the lens 203a onto the sensing aperture. The sensor 204 generates a signal which in an application is coupled to an amplifier or other signal conditioning device by electrical connections made to the leads 204a and 204b. In many instances an alternate configuration can be used where all or a portion of this signal conditioning device is integrated in the sensor package and in some cases can even be integrated on the same silicon chip as the sensor. The Burr-Brown device referenced previously, may be used. Changes may be made in the member 200 as required to physically accommodate a particular sensor. The amplifier or signal conditioning device generates a signal indicative of the light level which is input to a controller or to a readout device or to both in order to perform the function intended for the light sensor. In normal operations, a computer, micro controller, or other device which will generally be referred to as a controller is used to register the reading and to step a motor (not shown) the shaft 205 of which rotates the head 200 to its required positions. A stop or a position sensing device may be used so that the controller can establish the position of the head 200 in order to control motion of the head to its required position. One method of establishing position has already been detailed for the device of FIG. 2. The required sequence of readings is taken and processed by the controller and the appropriate readouts are indicated or control functions performed.

In FIG. 10, the cylindrical member 200 is positioned to receive an optical signal from the portion of the image focused on the sensing aperture 201a by a stationary lens 207. As the head 200 is rotated through a relatively small angle, new portions of the image projected by the lens 207 fall on the aperture 201a, are filtered by the filter 202a, and are in turn projected on the sensor aperture 204a by the lens 203a. The lens 207 is made large enough so that for a limited travel of the aperture 201a in the projected field of the lens 207, rays from the lens 207 still strike all of the surface of the lens 203a. The requirement here (approximating the lenses as thin lenses) is that for any position of the aperture 201a in the projected field of the lens 207 for which a reading is taken, straight lines drawn from any point on the surface of the lens 203a through any point in the aperture 201a should intersect the lens 207. If the diameter of the lens 207 is too small to meet this objective, the measured intensity will be reduced for positions for which the portions of the lens 203a are shadowed from the full view of the lens 207. As with the device of FIG. 2, an optional feature to permit relatively small linear displacement of the head 200 along the axial direction of its shaft 205 may be used to adjust the position of the aperture 201a in a direction perpendicular to the direction of its rotary motion to achieve a two dimensional scan of the image projected by the lens 207. Alternately the lens or sensor may be moved or some other means used when it is necessary to include a scan in a direction other than that provided by rotation of the member 200. Whenever axial displacement of the member 200 is used, the proper displacement must be restored to align the sensing head with the light pipes or other light sources.

The head is indexed 120 degrees counterclockwise (viewed from the top) to align the lens 203b and the green filter 202b through the aperture 201b. Then the green color component is measured in a manner identical to that used to measure the red color component. Then the head is indexed 120 degrees further to align the lens 203c and the blue filter 202c to measure the blue component of the light through a similar aperture 201c. More, or fewer, lenses and filter units may be positioned radially around the unit as the selection of more or fewer separate filter combinations is required. The filter color transmission characteristics are chosen to fit the application and do not need to be the red, green, and blue suggested.

An identification of and/or typical values for the components of the systems which are described hereinabove are as follows:

| R1 | Resistor | 68 ohm 0.5W |
|---|---|---|
| R2 | Resistor | 68 ohm 0.5W |
| R3 | Resistor | 68 ohm 0.5W |
| R4 | Resistor | 68 ohm 0.5W |
| R5 | Resistor | 68 ohm 0.5W |
| R6 | Resistor | 1.2K ohm |
| R7 | Resistor | 820 ohm |
| R8 | Resistor | 560 ohm |
| R9 | Resistor | 470 ohm |
| R10 | Resistor | 1.0K ohm |
| R10A | Resistor | 1.0K ohm |
| R11 | Resistor | 1.0K ohm |
| R12 | Resistor | 1.0K ohm |
| R13 | Resistor | 1.0K ohm |
| R14 | Resistor | 470 ohm |
| R15 | Resistor | 10K ohm |
| R15A | Resistor | 10K ohm |
| R16 | Resistor | 10K ohm |
| R17 | Resistor | 10K ohm |
| R18 | Resistor | 10K ohm |
| Q1 | Transistor | Motorola MPS2907A |
| Q1A | Transistor | Motorola MPS2907A |
| Q2 | Transistor | Motorola MPS2907A |
| Q3 | Transistor | Motorola MP52907A |
| Q4 | Transistor | Motorola MPS2907A |
| Q5 | Transistor | Motorola MPS2222A |
| Q6 | Transistor | 2N3904 |
| Q6A | Transistor | 2N3904 |
| Q7 | Transistor | 2N3904 |
| Q8 | Transistor | 2N3904 |
| Q9 | Transistor | 2N3904 |

It will be understood that these values, and/or descriptions may be varied depending upon the particular application of the principles of the present invention.

SUMMARY

The focus of the foregoing has been to provide an improved sensing configuration for a combined headlamp dimmer and a headlamp on/off control. Most of the features relevant to one or the other of these functions in the combined control are equally applicable to the corresponding function in a separate headlamp dimmer or headlamp on/off control. It should be recognized that certain features have many applications beyond the narrow application to the headlamp control. First, the stepping motor is novel and should find application in many areas quite independent of the headlamp control and independent of the translational feature.

Second, a number of the novel scanning, and color sensing features of the headlamp dimmer control can be performed by a multi-element silicon sensor or even by a video array. Of foremost importance is the ability to partition the field of view into smaller areas so that as taught previously, the diffuse light reflected from objects by the vehicle's own headlamps or coming from other sources over the total field of view does not drowned out the signal from the relatively weak tail lamps. Red color sensing to distinguish the tail lamps is also applicable and its optional but highly desirable use significantly improves the quality of the control function. Even the overlapping frame feature can be effectively incorporated by providing a soft focus which spreads the light from a point source such as a distant tail lamp over a half pixel or so. Depending on the specific arrangement, there is a great deal of latitude in the amount of soft focus which may be either intentionally introduced or utilized as part of a lower cost lens system. The intent is to moderately spread light rays so that as the rays from an imaged light source move from one pixel to another, part fall on an adjoining pixel sooner, thereby softening the transition as the readout shifts from one pixel to another. This creates a localized spatial averaging effect on the signals generated. For the purposes of analyzing the signal, this localized averaging effect on the response as the light in the projected image moves from one pixel to another in the dynamic driving situation can be of considerable advantage reducing the need to accomplish a similar function by a computation intensive digital means. Another important advantage is that the enlarged image of the soft focus prevents the loss of signal which occurs if the image is sharply focused on a non responsive boundary between pixels so that no pixel responds properly to the optical signal. Thus, the inherent averaging can actually reduce the complexity of the controller program which processes the data in addition to allowing the use of lower cost optics. As with the preferred device, the total field of view of the array sensor should be generally limited to that for which headlamps from the vehicle with the control are likely to cause glare for the driver of another vehicle. It is for this field of view that the headlamp dimmer control needs to sense the headlamps or tail lamps of other vehicles and respond by switching the lights to low beam. Introducing an excessively large field of view increases the risk of damage from focused rays of the sun. Also, it either introduces unnecessary nuisance dimming because of response to light sources which are in a field of view for which dimming is not required or necessitates extra control complexity to mask response to lights in these areas. It may also be generally wasteful of resources to provide imaging capability where it is not required.

An array sensor, especially a black and white one, may have the same high response to infrared from tungsten light sources as do many individual photo-diodes. With the increasing use of red light emitting diodes which emit little energy in the infrared range and more efficient gas discharge headlamps with greatly reduced infrared emission, it is prudent to assure that the sensor's infrared response is reasonably small and to eliminate at least a significant proportion of the sensors infrared response if it is not. The easiest way may be to use an infrared rejecting filter. If the infrared is not rejected and if the sensor has the same high response to infrared that many silicon photo-diodes have, eighty percent or more of the sensor's response to red tail lamps or even to headlamps may be due to the infrared. To a driver, it makes no difference whether the lights from another vehicle contain the strong infrared component or not so the effect of not reducing the high infrared response is to cause a mismatch of the order of five to one in the way that the control's sensor judges brightness of various light sources versus how the drivers see them. The general problem of rejection infrared is certainly not new. Vactec, now EG&G Vactec, has sold silicon photo-diodes with integrally incorporated infrared rejection filters since the late 1970's.

As indicated previously, the alternate embodiment of the rotary sensing head has many advantages which make it useful for color sensing instrumentation. These advantages include the ability to multiplex yet couple efficiently with optical signal sources from light pipes, the ability to select from a number of filter choices, the ability to use only one sensor, the ability to block light from the signal sources to take a blocked light reading and use it for correction or partial correction of the sensor readings, the ability to also use the projected image from a lens as a signal source and to scan the image field of the lens, and the ability to use a direct input signal source. Additionally the use of the common sensor and readout means minimizes the negative effect of a number of readout errors on color balance measurements.

While preferred embodiments of the invention have been illustrated and described, it will be understood that various changes and modifications may be made without departing from the spirit of the invention.

What is claimed is:

1. A control system automatically controlling the energization and de-energization of electrically energizable headlamps on an automotive vehicle, said control system comprising, in combination, means sensing the relative spectral intensities of the skylight levels of a broad area of the sky, said sensing means including means taking at least two skylight readings with different color responses and measuring the balance between a color component which is weighted towards the short wavelength part of the color spectrum relative to another differently weighted color component to differentiate between a cloudy sky and a blue sky, and means in said control system effective to energize and de-energize said headlamps as a function of the measured balance.

2. A control system automatically controlling modes of energization and de-energization and brightness of electrically energizable headlamps on an automotive vehicle, said control system comprising, in combination, sensing means taking at least two skylight measurements with different color responses, said sensing means including means measuring the balance between a color component which is weighted towards the short wavelength part of the color spectrum relative to another differently weighted color component to differentiate between a cloudy sky and a blue sky, and means in said control system controlling the modes of energization and de-energization and brightness of said headlamps as a function of the measured balance.

3. The combination as set forth in claim 2, said sensing means including at least two color filters.

4. The combination as set forth in claim 2, one of said sensor measurements being in the cyan range of the color spectrum, another of said measurements being in the red range of the color spectrum.

5. The combination as set forth in claim 3, said control system utilizing the relationship between multiple measurements through differently colored filters in making a determination to select the desired brightness mode of said headlamps.

6. A control system automatically controlling the energization and de-energization of electrically energizable headlamps on an automotive vehicle, said control system measuring the relative spectral intensities of the light levels of a broad area of the sky, said control system applying a predetermined functional relationship to at least two different color responses of said system to establish the relative spectral distribution in the light from the sky to determine whether the light is bluish in balance indicative of a clear sky or less bluish in balance indicative of an overcast sky, said control system operating in response to a less bluish balance to adjust the light threshold at which the headlamps are energized to favor energizing the headlamps during overcast conditions.

7. The combination as set forth in claim 6, said system including at least two color filters.

8. The combination as set forth in claim 6, one of said system measurements being in the cyan range of the color spectrum, another of said system measurements being in the red range of the color spectrum.

9. The combination as set forth in claim 7, said control system utilizing the relationship between multiple measurements through differently colored filters in making a determination to turn said headlamps on or off.

10. The combination as set forth in claim 6, said control system applying different color responses above and below 620 nm to determine whether the light from the sky is clear or overcast.

* * * * *